United States Patent [19]

Sternberg et al.

[11] Patent Number: 4,665,551

[45] Date of Patent: May 12, 1987

[54] APPARATUS AND METHOD FOR IMPLEMENTING TRANSFORMATIONS IN DIGITAL IMAGE PROCESSING

[75] Inventors: Stanley R. Sternberg; Glenn Herteg; Martin P. Koskella; Timothy S. Berla, all of Ann Arbor, Mich.

[73] Assignee: Machine Vision International Corporation, Ann Arbor, Mich.

[21] Appl. No.: 559,438

[22] Filed: Dec. 8, 1983

[51] Int. Cl.[4] .............................................. G06K 9/36
[52] U.S. Cl. ...................................... 382/49; 382/27; 382/41; 382/54
[58] Field of Search ........................ 382/27, 54, 41, 49

[56] References Cited

U.S. PATENT DOCUMENTS

| | | | |
|---|---|---|---|
| 3,106,699 | 10/1963 | Kamentsky | 340/172.5 |
| 3,214,574 | 10/1965 | Landsman et al. | 235/92 |
| 3,339,179 | 8/1967 | Shelton, Jr. et al. | 340/146.3 |
| 3,573,789 | 4/1971 | Sharp et al. | 340/324 |
| 3,805,035 | 4/1974 | Serra | 382/41 |
| 3,846,754 | 11/1974 | Oka et al. | 340/146.3 H |
| 3,899,771 | 8/1975 | Saraga et al. | 340/146.3 AE |
| 4,167,728 | 9/1979 | Sternberg | 340/146.3 MA |
| 4,174,514 | 11/1979 | Sternberg | 340/146.3 MA |
| 4,290,049 | 9/1981 | Sternberg et al. | 340/146.3 MA |
| 4,301,443 | 11/1981 | Sternberg et al. | 340/146.3 MA |
| 4,322,716 | 3/1982 | Sternberg | 340/146.3 MA |
| 4,369,430 | 1/1983 | Sternberg | 340/146.3 MA |
| 4,395,697 | 7/1983 | Lougheed et al. | 338/32 H |
| 4,395,698 | 7/1983 | Sternberg | 382/27 |
| 4,395,699 | 7/1983 | Sternberg | 382/41 |
| 4,395,700 | 7/1983 | McCubbrey et al. | 382/27 |
| 4,445,137 | 4/1984 | Panofsky | 382/41 |

OTHER PUBLICATIONS

United States Patent Application Ser. No. 513,448; entitled Apparatus and Method for Implementing Dilation and Erosion Transformations in Digital Image Processing; filed 07/13/83; Applicant: Stanley R. Sternberg.
"Industrial Computer Vision by Mathematical Morphology" by Stanley R. Sternberg; Proceedings of the 13th International Symposium on Industrial Robots/-Robots 7, Chicago, Illinois, Apr. 18-20, 1983.
"Biomedical Image Processing" by Stanley R. Sternberg; Copyright 1983 IEEE; published Jan. 1983 issue of *Computer*.
"Computer Architectures Specialized for Mathematical Morphology" by Stanley R. Sternberg, Dept. of Electrical and Computer Engineering, University of Michigan; Workshop on Algorithmically Specialized Computer Organizations, Purdue Univ., West Lafayette, Ind., Sep. 29–Oct. 1, 1982.
"A Comparison of Computer Vision Methodologies" by Stanley R. Sternberg; Dec. 21, 1981.
"Computer Architectures for Pictorial Information Systems" by Per–Erik Danielsson and Stefano Levialdi; Copyright 1981 IEEE; published in Nov. 1981, issue of *Computer*.

(List continued on next page.)

*Primary Examiner*—Leo H. Boudreau
*Attorney, Agent, or Firm*—Price, Heneveld, Cooper, DeWitt & Litton

[57] ABSTRACT

The specification discloses a system and method for processing digital representations of images by routing the representations sequentially through a plurality of function units. Each function unit includes a delay for delaying one of two inputs and a logic unit for performing logical operations on the delayed and undelayed signals to produce two outputs. The logic unit performs any one of a plurality of logic functions as dynamically selected during processing. Specific functions of particular interest include (1) ORing the delayed signal and the original digital signal and (2) ANDing the delayed signal and the original digital signal. The delay includes a first shift register through which the serial signal is shifted, a storage device for storing signal segments read from the first shift register, and a second shift register into which the segments are returned from storage to be re-serialized to produce the delayed signal.

37 Claims, 37 Drawing Figures

OTHER PUBLICATIONS

Pages 836-840 of IEEE Transactions on Computers., vol. C-29, No. 9, Sep. 1980. "Design of a Massively Parallel Processor" by Kenneth E. Batcher; Copyright 1980 IEEE.

"A Systematically Designed Binary Array Processor" by Anthony P. Reeves, published in the IEEE Transactions on Computers, vol. C-29, No. 4, Apr. 1980, pp. 278-287.

"Design and Use of DIP-1: A Fast, Flexible and Dynamically Microprogrammable Pipelined Image Processor" by F. A. Gerritsen and L. G. Aardema, Delft University of Technology, Delft, The Netherlands, Jan. 1980, Revised May 1980.

"Parallel Architectures for Image Processing" by Stanley R. Sternberg; Copyright 1979 IEEE Compsac.

"Basics of Cellular Logic with Some Applications in Medical Image Processing" by Kendell Preston, Jr. Michael J. B. Duff, Stephano Levialdi, Philip E. Norgren and Jun-Ichiro Toriwaki; published in May 1979, Proceedings of the IEEE, vol. 67, No. 5, pp. 826-859.

"Cytocomputer Real-Time Pattern Recognition" by Stanley R. Sternberg; Based on presentation to the Eighth Annual Automatic Imagery Pattern Recognition Symposium, National Bureau of Standards, Gaithersburg, Maryland, Apr. 3-4, 1978.

"Advanced Analysis of SLR Changes" Westinghouse Electric Corporation; Final Technical Report, Nov. 1974. Report sent to Rome Air Developement Center, Air Force Systems Command, Griffiss Air Force Base, New York 13441.

"A Parallel Picture Processing Machine" by Bjorn Kruse. Published in Dec. 1973, issue of IEEE Transactions on Computers, vol. C-22, No. 12, pp. 1075-1086.

"Interactive Image Processor Speeds Pattern Recognition by Computer" by Kendall Preston, Jr. and Philip E. Norgren. Published in Oct. 23, 1972, issue of *Electronics,* pp. 89-98.

"The Texture Analyser" by J. C. Klein and J. Serra. Published in the Apr. 1972, Journal of Microscopy, vol. 95, Pt 2, pp. 349-356.

"Feature Extraction by Golay Hexagonal Pattern Transforms" by Kendall Preston, Jr. Published in the Sep. 1971, issue of IEEE Transactions on Computers, pp. 1007-1014, vol. C-20, No. 9.

"Local Properties of Binary Images in Two Dimensions" by Stephen B. Gray. Published in the May 1971, issue of IEEE Transactions on Computers, vol. C-20, No. 5, pp. 551-561.

"Hexagonal Parallel Pattern Transformations" by Marcel J. E. Golay. Published in the Aug. 1969, issue of IEEE Transactions on Computers, vol. C-18, No. 8, pp. 733-739.

"The Illinois Pattern Recognition Computer—ILLIAC III" by Bruce H. McCormick. Published in the 1963, issue of IEEE Transactions on Electronic Computers, pp. 791-813.

"Blood-Cell Scanner Identifies Rare Cells" by Nicholas F. Izzo and William Coles. Published in the Apr. 27, 1962, issue of *Electronics,* pp. 52-57.

"Pattern Detection and Recognition" by S. H. Unger. Published in the Oct. 1959, issue of the Proceedings of the IRE, pp. 1737-1752.

"A Computer Oriented Toward Spatial Problems" by S. H. Unger. Published in the Oct. 1958, issue of the Proceedings of the IRE. pp. 1744-1750.

"Cellular Computers and Bimedical Image Processing" by Stanley R. Sternberg, Reprinted from Lecture Notes in Medical Informatics, vol. 17, Biomedical Images and Computers Edited by J. Sklansky and J. C. Bisconte, Springer-Verlag Publishers, Berlin, Heidelberg, N.Y.

"The GOP, A Fast and Flexible Image Processor" by Goesta H. Granlund.

| OPS | OSS | OUTPUT |
|---|---|---|
| 0 | 0 | DATA PASS |
| 0 | 1 | SEND |
| 1 | 0 | PEND |
| 1 | 1 | ∅ |

| | 170 | | | 168 |
|---|---|---|---|---|
| | SELECTOR SIG | | | OPERATOR |
| F3 | F2 | F1 | F0 | |
| 0 | 0 | 0 | 0 | ZERO |
| 0 | 0 | 0 | 1 | NOT (A OR B) |
| 0 | 0 | 1 | 0 | A AND $\bar{B}$ |
| 0 | 0 | 1 | 1 | NOT B |
| 0 | 1 | 0 | 0 | $\bar{A}$ AND B |
| 0 | 1 | 0 | 1 | NOT A |
| 0 | 1 | 1 | 0 | A XOR B |
| 0 | 1 | 1 | 1 | NOT (A AND B) |
| 1 | 0 | 0 | 0 | A AND B |
| 1 | 0 | 0 | 1 | NOT (A XOR B) |
| 1 | 0 | 1 | 0 | A |
| 1 | 0 | 1 | 1 | NOT ($\bar{A}$ AND B) |
| 1 | 1 | 0 | 0 | B |
| 1 | 1 | 0 | 1 | NOT (A AND $\bar{B}$) |
| 1 | 1 | 1 | 0 | A OR B |
| 1 | 1 | 1 | 1 | ONE |

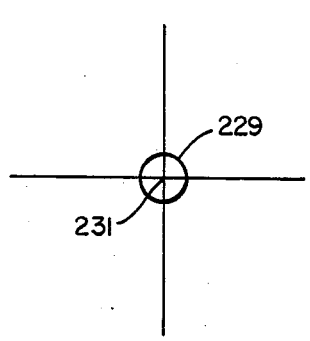
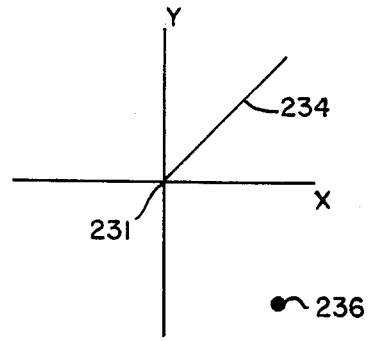
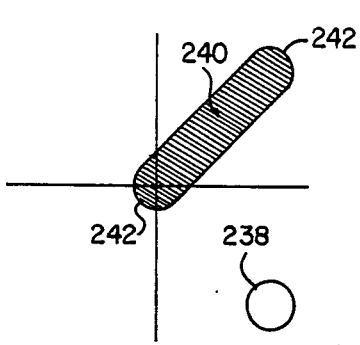
FIG. 10                FIG. 11                FIG. 12
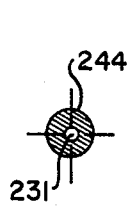
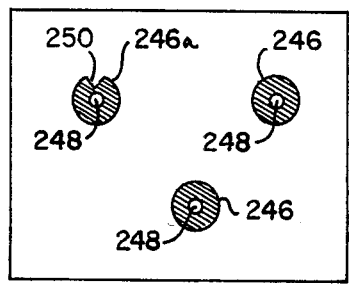
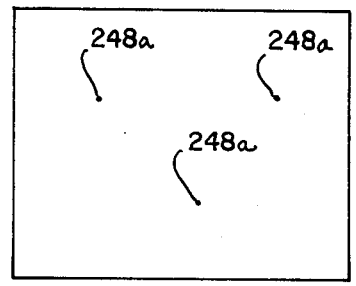
FIG. 13        FIG. 14                FIG. 15
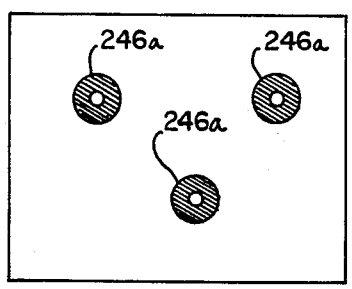
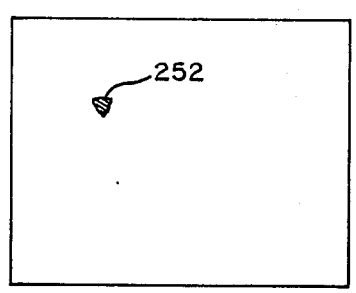
FIG. 16                FIG. 17

APPARATUS AND METHOD FOR IMPLEMENTING TRANSFORMATIONS IN DIGITAL IMAGE PROCESSING

BACKGROUND OF THE INVENTION

The present invention relates to image processing systems and methods, and more particularly to digital systems and methods.

A wide variety of image processing systems have been developed enabling digital computers to "see" or "read" an image. Typically, these image processors include a video camera, an analog-to-digital converter for digitizing the video signal produced by the camera, and a digital device for processing the digitized information. Typically, the image is digitized into a matrix or lattice of pixels with each video scan line divided into 512 pixels. These image processors are capable of scanning digital images and processing the digital information to interpret the image.

One extremely efficient image processor is disclosed in U.S. patent application Ser. No. 513,448, filed July 13, 1983, by Sternberg, entitled APPARATUS AND METHOD FOR IMPLEMENTING DILATION AND EROSION TRANSFORMATIONS IN DIGITAL IMAGE PROCESSING, and assigned to the assignee of the present application. The system disclosed therein includes digital circuitry for effecting a dilation of a serialized digital stream representative of an image. More specifically, the circuitry includes digital devices for repetitively delaying the serialized digital signal and ORing the delayed digital signal back into the serialized signal stream.

In further development of the Sternberg image processor, it was recognized that the device had two limitations. First, the processor performed its signal processing by repetitively delaying the serial signal and ORing the delayed signal back into the cumulative signal stream. Consequently, the processor is capable of dilating and/or eroding by a restricted variety of structuring elements (i.e., polar symmetric structuring elements). Second, the delays for the digital signal streams were either shift registers or rings implemented in random access memory. Shift registers for relatively long delays were relatively complicated and expensive when implemented in hardware. On the other hand, reading and writing the data stream pixel-by-pixel into and out of a random access memory at the requisite rate of 10 megahertz required extremely fast and expensive memory devices.

Another image processor, less efficient than the above described Sternberg device, routes the image sequentially through several neighborhood transformations to detect limited image features. At each neighborhood transformation stage, the "neighborhood" of pixels surrounding a given pixel in one image is examined and the corresponding pixel in the new image is given a digital value which is a function of the neighborhood pixels in the old image. All neighborhood pixels in an image are made available for processing by serially routing the digital image through one or more shift registers. As the image is shifted through the registers, the appropriate register locations are simultaneously accessed to process a particular neighborhood.

The neighborhood processor is not without its drawbacks. First, the entire neighborhood of a pixel must be made available and examined before the corresponding pixel in the new image can be given a value. This requires delay and excessively complicated circuity to make the neighborhood pixels simultaneously available to drive the neighborhood function generator. Second, the neighborhood processing theory is an inefficient and cumbersome method of effecting image transformations. Third, the neighborhood theory greatly restricts the operations which can be performed, due to the limited size of the neighborhood. Although in theory the neighborhood could be enlarged, the hardware required to implement such a neighborhood enlargement would be relatively expensive and/or complicated.

SUMMARY OF THE INVENTION

The aforementioned problems are solved by the present invention. In a first aspect of the invention, a geometric logic unit for an image processor is provided wherein the functions performed by the logic unit can be dynamically selected during image processing to effect a variety of image manipulations. More specifically, the logic unit includes input ports which receive at least one input serial signal representative of an image, delay means for delaying selected ones of the input signals to produce delayed serial signals, a logic section for performing operations one selected ones of the delayed signals and the input signals, and output port means for outputting the signals from the logic section. The logic section is capable of performing at least two logical operations, and includes a selector section for dynamically selecting the specific logic function to be performed during any pass of the serial signal through the logic section. Consequently, the geometric logic unit is capable of performing a wide variety of image transformations because each logic section can be dynamically directed to perform any one of a variety of logic functions to achieve a desired result. In a preferred embodiment of this first aspect, the logic section performs two or more simultaneous but distinct logic operations, each of which is dynamically selectable via a selector section from a variety of available logic functions. This enables even greater image processing capabilities due to the fact that the logical capabilities, and therefore the variety of possible image transformations, are greatly enhanced.

In a second aspect of the invention, a geometric logic unit is provided for dilating an image by a non-polar symmetric structuring element. This aspect of the logic unit includes a plurality of serially coupled stages, each including a delay for delaying an input serial signal and a comparator for selecting the maximum of the delayed signal and the original image signal. The output of each stage is inputted to the next sequential stage. Such a system enables dilation by any shaped structuring element, including rings, lines, or arcs. This greatly enhances the functional capabilities of the processing system.

In a third aspect of the invention, a geometric logic unit for an image processor is provided for eroding by a non-polar symmetric structuring element. This aspect of the processor includes a plurality of sequentially coupled stages, each including a delay for delaying an input signal and a comparator for selecting the minimum of the delayed signal and the original image signal. The output of each stage is inputted to the next sequential stage. Such a geometric logic unit enables the image to be eroded by any definable structuring element, for example, rings, lines, discs, and arcs. In a preferred embodiment of this aspect, the geometric logic unit further includes means for complementing one or both of the delayed signal and the original image signal inputted to each comparator. This structure enables "template matching" which is the simultaneous erosion of the foreground and the background of the digital image.

In a fourth aspect of the invention, a digital delay is provided enabling serial signals to be sequentially stored in and read from a single memory device having a longer read/write cycle than the clock cycle of the serial signals. More particularly, the delay includes devices for (1) reading snapshots or segments of the serial stream, (2) sequentially storing the segments in parallel in a memory device, (3) retrieving the segments from the memory device, and (4) reserializing the retrieved segments to produce a delayed serial stream. This structure enables the use of relatively low-cost memory devices having relatively long read/write cycles, but still providing the requisite apparent speed required to handle the input stream. Accordingly, this aspect of the invention enables the construction of a geometric logic unit at relatively low cost, while still providing the necessary performance capabilities.

These and other objects, advantages, and features of the invention will be more fully understood and appreciated by reference to the detailed description of the preferred embodiment and the drawings.

BRIEF DESCRIPTION OF THE DRAWINGS

FIG. 10 is a diagram of a ring-shaped structuring element;

FIG. 11 is a diagram of an image to be dilated;

FIG. 12 is a diagram of the dilation of the FIG. 11 image by the FIG. 10 structuring element;

FIG. 13 is a diagram of a donut-shaped structuring element;

FIG. 14 is an image of a portion of a printed circuit board showing three pads encircling three holes;

FIG. 15 is an image of the center of the holes of FIG. 14;

FIG. 16 is an image of the dilation of the FIG. 15 image by the FIG. 13 structuring element;

FIG. 17 is an image of the logical difference between the images of FIGS. 14 and 16;

DETAILED DESCRIPTION OF THE PREFERRED EMBODIMENT

Image Processor Overview

Figure 1:
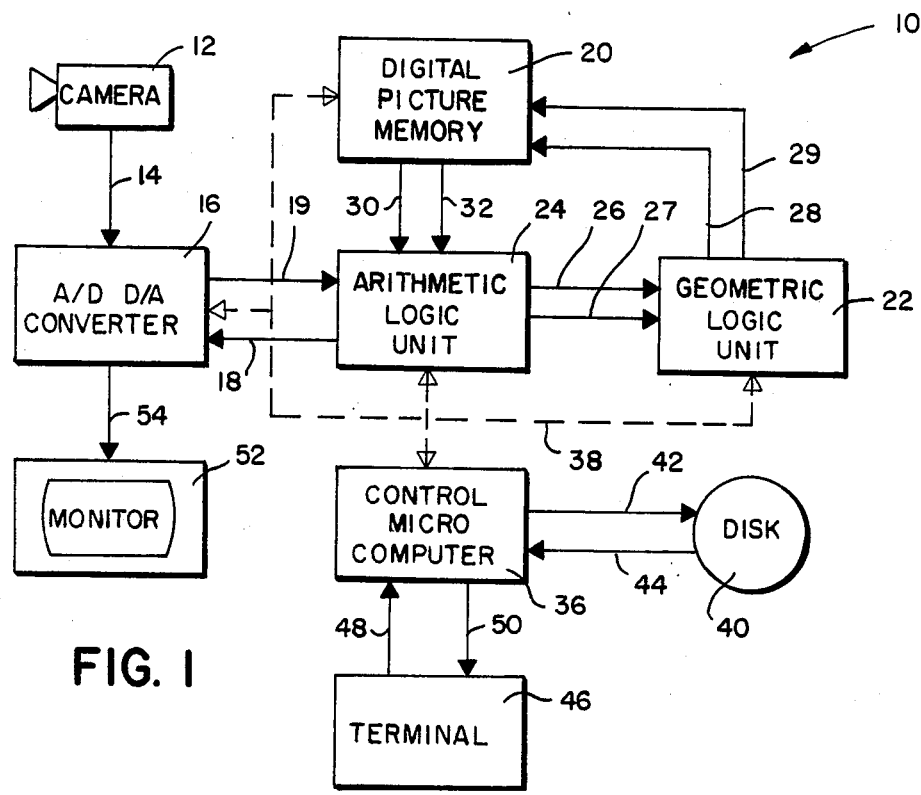
FIG. 1 is a schematic diagram showing the digital image processor of the present invention.

A digital image processor 10, constructed in accordance with a preferred embodiment of the invention, is illustrated in FIG. 1, wherein data lines are illustrated as solid lines, and control lines are indicated as broken lines. System 10 includes camera 12 providing a standard RS170 signal on output line 14. The analog composite video signal is transmitted over line 14 at a rate of 30 frames per second with 480 horizontal scan lines per frame. Analog-to-digital (A/D) and digital-to-analog (D/A) converter 16 converts the analog serial signal received on line 14 to a serial digital signal outputted on line 19 to arithmetic logic unit (ALU) 24. Similarly, converter 16 can convert a digital signal received on line 18 from ALU 24 to an analog signal on line 54 to monitor 52. Alternatively, the analog signal on line 14 can be passed directly to monitor 52 via line 54. The digital signal on one-bit line 19 includes one bit for each pixel in the video image. That is to say that the analog signal is digitized into 512 pixels per line on each of the 480 lines. Therefore, the processed image is made up of a matrix of lattice points or pixels. The bit corresponding to a pixel is set to 1 if the analog pixel signal exceeds a predetermined intensity and is set to 0 if the analog pixel signal does not exceed the predetermined intensity.

Arithmetic logic unit (ALU) 24 (FIG. 1) is a point processor, meaning that operations are carried out on the input image or images on a pixel-by-pixel basis to create an output image. Data input lines 19, 30, and 32 are utilized to convey one or two digital images from converter 16 and/or memory 20 to ALU 24 for processing. The digital images created in ALU 24 are outputted on lines 18, 26, and 27 for display on monitor 52 or for storage in memory 20 through geometric logic unit (GLU) 22. ALU 24 is capable, for example, of simply passing images, adding two digital images, subtracting two images, multiplying two images, ANDing two images, ORing two images, or complementing an image. ALU 24 is generally well known to those having ordinary skill in the art and in the preferred embodiment is a Model ALU512 logic unit manufactured by Imaging Technologies of Wolburn, Mass.

Geometric logic unit (GLU) 22 (FIG. 1) is coupled to ALU 24 and digital picture memory 20. Geometric logic unit 22 is more clearly illustrated in FIGS. 2–7 to be discussed below. Suffice it to say at this point that input data lines 26 and 27 each serially apply one digital bit plane image from ALU 24 to geometric logic unit 22 for processing. A digital bit plane image is a single bit binary image. An output serial digital bit plane image is conveyed on one or both of lines 28 and 29 from GLU 22 to digital picture memory 20 for storage in the memory.

The digital picture memory 20 is coupled to GLU 22 and ALU 24. In the preferred embodiment, memory 20 is three 512 by 512 by 8 bit storage devices such that three separate digital images can be stored therein simultaneously (FIG. 1). Although each storage device is 8 bits wide, only one bit plane of the width is used to store the digital image information. In the preferred embodiment, converter 16 is a Model AP512 converter, and memory 20 is three FB512 storage devices, all manufactured by Imaging Technologies of Wolburn, Mass. Alternatively, one of the 8-bit storage devices could be utilized to store eight separate bit plane images.

Overall system control is provided to system 10 by control microprocessor 36 (FIG. 1) which is coupled to converter 16, digital picture memory 20, GLU 22, and ALU 24 through control multibus 38. Control signals are issued by computer 36 over multibus 38 during each vertical retrace of camera 12 to condition system 10 for a possible imaging operation during the next frame period of the camera. GLU 22 or ALU 24 may be entered and actuated once and only once during each frame period to produce one entire digital bit plane output image to be stored in memory 20. Each frame contains approximately one-quarter million (250,000) pixels, so that in the preferred embodiment, GLU 22 and ALU 24 operate at a speed of approximately ten megahertz (MHz) to process one entire digital image during approximately one frame cycle and leave sufficient time for control computer 36 to reprogram the units for operation during the next frame cycle. Disc 40 is conventionally coupled through lines 42 and 44 to computer 36 to provide the requisite storage for the computer. Terminal 46 including a keyboard is conventionally coupled through lines 48 and 59 to computer 36 to provide a means of communicating command signals to the computer. In the preferred embodiment, computer 36 comprises a MOTOROLA 68000 microcomputer having 512K bytes of memory, and disc 40 is manufactured by Amcodyne.

Video monitor 52 (FIG. 1) is coupled to converter 16 through analog line 54 to output either the image on line 14 or any one of the three images in memory 20 as outputted through ALU 24.

System 10 as thus far described is somewhat similar to the image processing system disclosed in U.S. patent application Ser. No. 513,448, filed July 13, 1983, by Sternberg, entitled APPARATUS AND METHOD FOR IMPLEMENTING DILATION AND EROSION TRANSFORMATIONS IN DIGITAL IMAGE PROCESSING and assigned to the assignee of the present invention. The disclosure of said application is specifically incorporated herein by reference. The present system differs from the referenced system primarily in the construction of the geometric logic unit 22.

Geometric Logic Unit (GLU)

FIGS. 2–7 illustrate the geometric logic unit (GLU) 22. Generally, GLU 22 comprises a plurality of serially coupled GLU boards 23 (FIG. 2) each including video bus interface 56 and three stages 58, 60, and 62. These three stages are generally identical to one another; first stage 58 is illustrated in detail in FIG. 5; second and third stages 60 and 62 are generally equivalent thereto. Video signals are introduced to GLU boards 23 and more particularly to video bus interface 56 via 8-line buses 26 and 27. Similarly, the processed signals exit GLU board 23 on buses 28 and 29, each of which comprises an 8-line bus. Buses 28 and 29 lead to the next sequential GLU board 23, if one exists, or to memory 20 (see also FIG. 1).

GLU Video Bus Interface

Video bus interface 56 (FIG. 2) generally includes input source select 64, input process select 66, and output select unit 68. Four-line bus 70 applies input source select (ISS) signal to input source select 64 which is implemented via PAL technology as a multiplexer. ISS selects which one of the 16 bit planes on buses 26 and 27 will exit select box 64 on one-bit line 72. Similarly, input process select (IPS) signal is applied on four-line bus 74 to input process select 66, which is implemented in PAL technology as a multiplexer. IPS determines which one of the incoming bit planes on video bus 26, 27 will exit the input process select box on one-bit line 76. Consequently, ISS and IPS determine which two bit planes will be passed on sequentially through stages 58, 60, and 62 of GLU 22. In certain cases, and indeed all of the cases illustrated in this application, ISS and IPS will be identical to one another such that the same bit plane is outputted on lines 72 and 76 from multiplexers 64 and 66.

Output select unit 68 (FIG. 2) is a complex multiplexer implemented via PAL technology. Inputs to select unit 68 include 16-line bus 26 and 27, two one-bit lines 78 and 80 from third stage 62, and two 16-line buses 82 and 84 which provide select signals to multiplexer 68. The serial digital signals exiting third stage 62 on lines 78 and 80 are representative of processed images. Output source select (OSS) signal is applied on 16-bit line 82, and output process select (OPS) signal is applied on 16-bit line 84, to unit 68. Signals OPS and OSS control the output applied to each line of video bus 28, 29 as will be described.

Figures 3, 4:
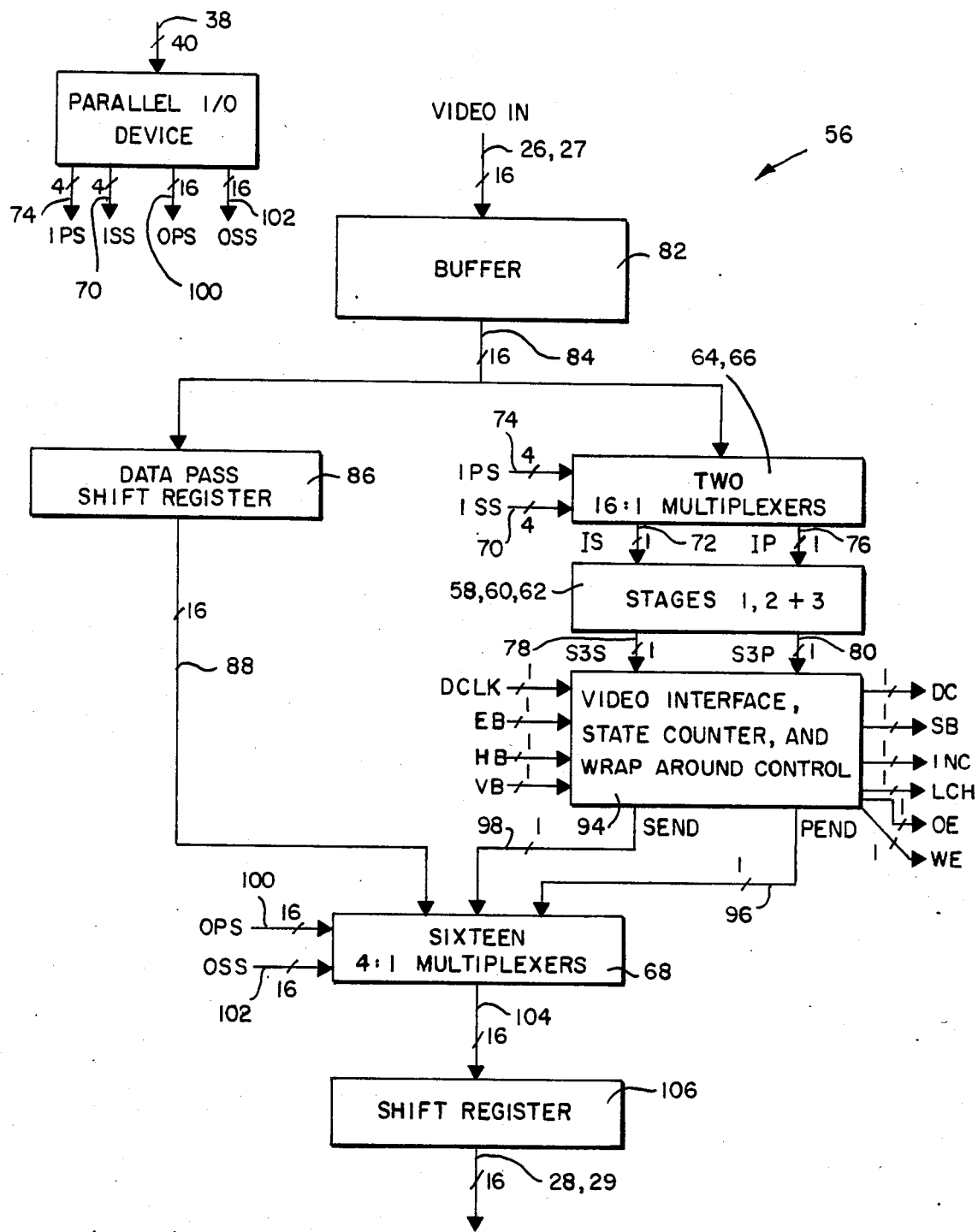
FIG. 3 is a schematic diagram showing the video bus interface of the geometric logic board.
FIG. 4 is a function table illustrating the operation of the output multiplexer of the video bus interface.

Video bus interface 56 is illustrated in greater detail in FIG. 3. Control signals are received over multibus 38 at parallel I/O device 57 to supply control signals IPS, ISS, OPS, and OSS to buses 74, 70, 100, and 102, respectively. Video bus 26, 27 conveys the digitized serial signals indicative of the images to be processed into buffers 82 which are octal buffers with hysteresis for signal cleanup. The digitized signals exit buffer 82 via 16-line bus 84 and are applied to both data pass shift register 86 and the input source select and the input process select multiplexers 64, 66.

Shift register 86 (FIG. 3) provides a three-pixel delay data pass so that the signal exiting on 16-line bus 88 is delayed by three pixel times from the signal applied to the register on bus 84. The signal on bus 88 is applied to complex multiplexer 68. The three-pixel delay provided by shift register 86 is necessary to correspond to the minimum delay provided by the stages 58, 60, and 62 (as will be described) if the signal passes through the stages to provide matched timing between the two branches.

Multiplexers 64, 66 (FIG. 3) operate as described above to route the appropriate bit planes to the three stages 58, 60, and 62 depending upon IPS and ISS on lines 74 and 70, respectively. The input source (IS) bit plane selected by ISS is outputted on one-bit line 72, while the input process (IP) bit plane selected by IPS is outputted on one-bit line 76. Bit planes IS and IP are delivered to the three stages 58, 60, and 62, from which the third stage process (S3P) bit plane and third stage source (S3S) bit plane exit via one-bit lines 80 and 78, respectively.

Video interface, state counter, and wrap around control 94 (FIG. 3) provide control signals DC, SB, INC, LCH, OE, and WE based on input signals DCLK, HB, EB, and VB. Dot clock (DCLK) is a signal received from frame buffer 20 and is a continual 10 megahertz clock corresponding to the rate at which pixel information is transmitted to and from memory 20 and through GLU 22. Horizontal blank (HB) is also a signal received from memory 20 and is high during a horizontal retrace and is low otherwise. Early blank (EB) is a signal received from memory 20 and goes high eight pixel times before HB goes high and goes low eight pixel times before HB goes low. Similarly, vertical blank (VB) is a signal received from memory 20 and is high during a vertical retrace and is low otherwise.

Output signal dot clock (DC) (FIG. 3) is a 10 megahertz clock outputted only when both HB and VB are low (i.e., during active pixel transmission). S-blank (SB) is a signal enabling memory 20 to acquire the processed information into its memory. SB is a function of EB, HB, and VB and can be implemented by one having ordinary skill in the art to provide the appropriate write enable signal to frame buffer 20. Increment counters (INC), latch (LCH), output enable (OE), and write enable (WE) are all one-bit signals which are high once every eight DC pulses and low otherwise. However, INC, LCH, OE, and WE are not necessarily high on the same pulse as will be described.

Signals S3P and S3S received from the stages 58, 60, and 62 are also inputted to video interface and state counter 94 via lines 80 and 78, respectively (FIG. 3). Process end (PEND) bit plane signal exits box 94 via line 96 and is applied to complex multiplexer 68. Similarly, source end (SEND) signal exits interface 94 via one-bit line 98 and is applied to complex multiplexer 68. Bit planes PEND and SEND correspond to bit planes S3P and S3S, respectively, in the active video region as determined by signals EB, HB, and VB. The construction and implementation of video interface, state counter, and wrap around control 94 is routine to one having ordinary skill in the art to achieve the above described functions.

Output select unit or complex multiplexer 68 (FIG. 3) receives data input signals from 16-line bus 88 and lines 96 and 98. Output process select (OPS) signal and output source select (OSS) signal are both 16-bit signals and are applied to multiplexer 68 via lines 100 and 102, respectively. Multiplexer 68 outputs a 16-bit signal on 16-line bus 104. Each line of bus 104 is regulated by the combination of the corresponding bits of OPS and OSS as illustrated in FIG. 4. For example, if both OPS and OSS are zero in a common bit position, multiplexer 68 will output on line 104 the data signal from the same bit position of bus 88. Similarly, if OPS is zero and OSS is one, in a common bit position, SEND from line 98 will be outputted on the corresponding bit position of bus 104. When OPS is one and OSS is zero in a common bit position, PEND from line 96 is outputted on the corresponding line of bus 104. Finally, when both OPS and OSS are one in a common bit position, binary zero is outputted on the corresponding line of bus 104. Bus 104 passes through a shift register 106 which provides a one-pixel or one-shift delay such that the 16-bit data signal outputted on 16-line bus 28, 29 is identical to the signal on bus 104 delayed by one pixel.

GLU Stage

Figure 5:
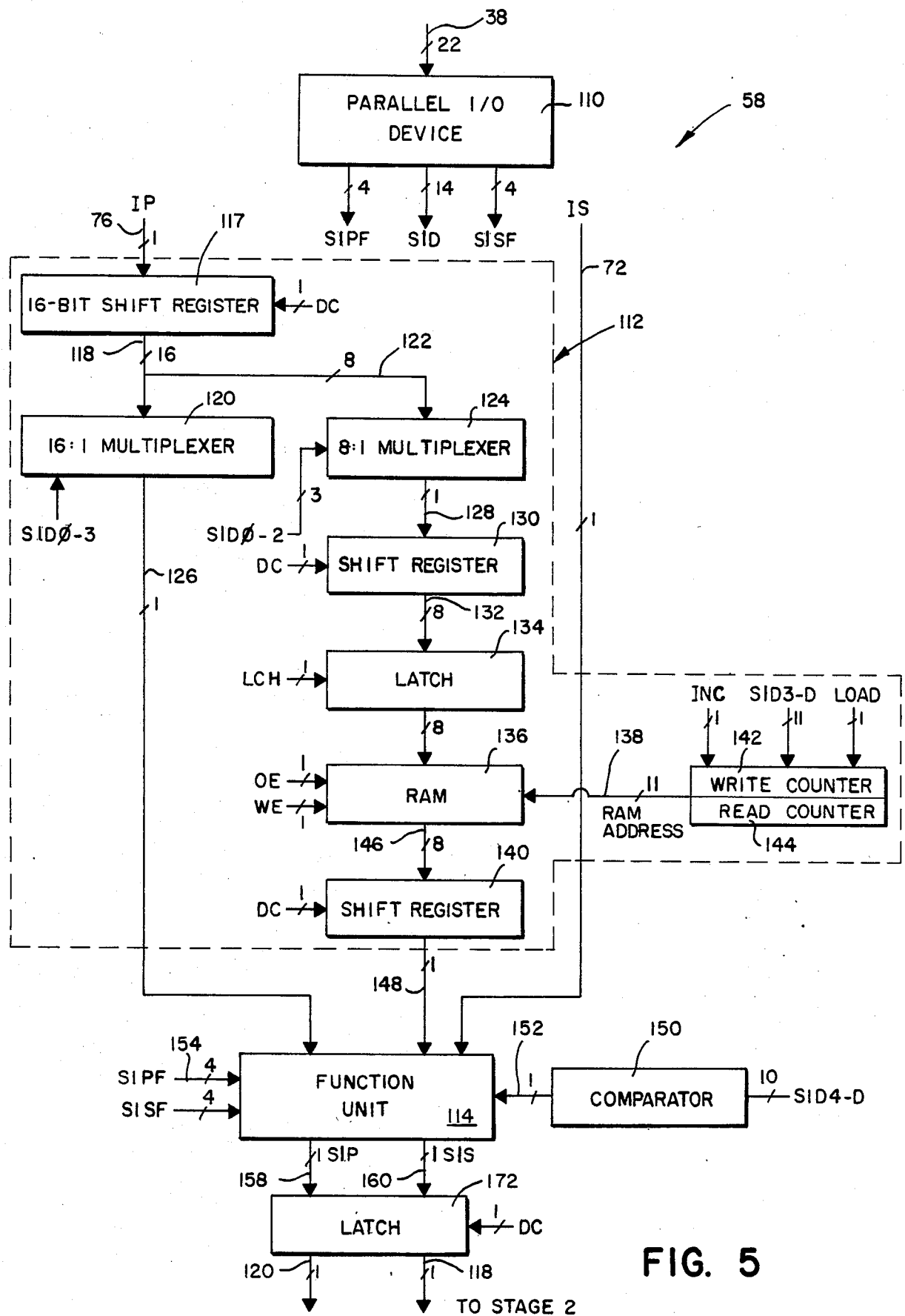
FIG. 5 is a schematic diagram showing the first logic stage of the geometric logic board.
Figures 6, 7:
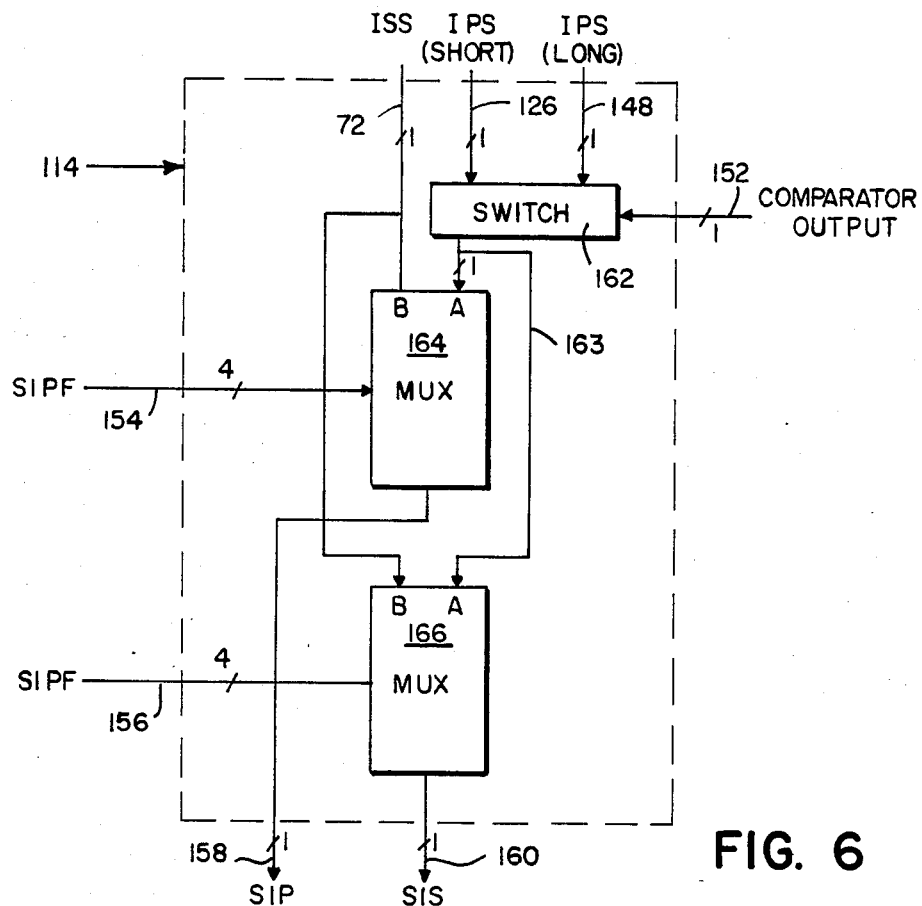
FIG. 6 is a schematic diagram showing the first stage function unit.
FIG. 7 is a function table illustrating the function of the multiplexers within the first stage function unit.

Stages 58, 60, and 62 (FIG. 2) are generally similar to one another. Accordingly, only first stage 58 will be described in detail. As seen in FIG. 5, the control signals from computer 36 (see also FIG. 1) are received by first stage 58 at parallel I/O device 110. Twenty-two bits of control bus 38 are inputted to device 110, from which exit four-bit first stage process function (S1PF) signal, four-bit first stage source function (S1SF) signal, and 14-bit first stage delay (S1D) signal. Bit planes IP and IS are received from video bus interface 56 on lines 76 and 72 (see also FIG. 3).

First stage 58 (FIG. 2) generally includes delay 112 and function unit 114. Delay 112 provides a delay of zero to 16,383 (16K−1) pixels as specified by S1D. The delayed signal is outputted on line 116 to function unit 114. The signal from input source select 64 is inputted via line 72 directly to function unit 114. Function unit 114 performs logical operations or functions on the signals received on lines 72 and 116 to produce bit plane outputs on lines 118 and 120.

GLU Stage Delay

Delay 112 (FIG. 5) provides a delay for incoming signal IP of anywhere between 0 and 16,383 (16K−1) pixel times. This corresponds to a maximum delay of 32 scan lines minus one pixel. IP coming into delay 112 on line 76 is fed into the low-order end of 16-bit shift register 117 which is clocked by signal DC from video interface 94 (see also FIG. 3). All 16 bits of register 117 are available via bus 118 and are fed directly to 16-to-1 multiplexer 120. The low-order eight bits of shift register 117 are delivered via 8-line bus 122 to 8-to-1 multiplexer 124. Both of multiplexers 120 and 124 are implemented in PAL technology. S1D is a 14-bit signal specifying the delay to be provided by stage delay 112.

The lowest order bit of the 14-bit signal is denominated S1D0, while the highest order bit of the signal is denominated S1DD (the final D being the hex designation for 13). The four lowest order bits of signal S1D, namely S1D0-3, are inputted to multiplexer 120 to perform a select function. Consequently, S1D0-3 selects which of the 16 input lines 118 from shift register 117 are outputted from multiplexer 120 on one-bit line 126. Any shift of 15 or fewer pixels is performed solely by shift register 117 and multiplexer 120, and the delayed signal is delivered to function unit 114 via line 126. The long-shift section of delay 112 extends between line 122 and line 148.

The select signal for multiplexer 124 is the three low-order bits of S1D, namely S1D0-2. These three bits determine which of the eight low-order bits of shift register 117 will be outputted from multiplexer 124 on one-bit line 128 to shift register 130. Shift register 130 includes eight bits and is also clocked by DC to enable eight bits of the incoming bit plane to be sampled or read in parallel from the register on 8-line bus 132. Latch 134 is provided and is clocked by signal LCH from video interface 94 (see also FIG. 3) enabling "snapshots" or "segments" of the incoming bit stream to be taken from shift register 130 in parallel and held for a subsequent write operation into random access memory (RAM) 136.

Output enable (OE) signal is inputted to RAM 136 and when high permits the contents of the memory location at the address on address bus 138 to be read from the RAM to shift register 140. Similarly, write enable (WE) signal is inputted to RAM 136 and when high enables the contents of latch 134 to be stored at the memory location of the address on address bus 138. RAM 136 is a 2K by 8 bit (16K bits) RAM having a read/write cycle of approximately 250 nanoseconds (nsec.). Consequently, all 16K−1 possible delays can be implemented in RAM 136 as 2K words of 8 bits each.

Write counter 142 and read counter 144 are octal counters of 11 bits each implemented as PALs (FIG. 5). At the initiation of a pass through the GLU, the 11 high-order bits of signal S1D (S1D3-D) are inputted to write counter 142 when LOAD goes high as issued by control computer 36 (see also FIG. 1). The value "one" is loaded into read counter 144 when LOAD goes high. During operation of the GLU, increment counters (INC) signal is inputted to both of counters 142 and 144 to increment their contents. Because INC goes high once every eight pixels, both counters are incremented after each eight pixels. Accordingly, the difference between write counter 142 and read counter 144 is always equal to the specified delay S1D divided by 8.

Shift register 140 (FIG. 5) receives the output words from RAM 136 via 8-bit bus 146. Shift register 140 is clocked by signal DC from video interface 94 (see also FIG. 3) to sequentially shift or re-serialize the words onto one-bit line 148 which leads to function unit 114. Consequently, two delayed IP signals are delivered to function unit 114—one from short shift line 126 and one from long shift line 148. Only one of the delayed IP signals is utilized by function unit 114 as selected by PAL comparator 150 whose input is the 10 high-order bits of S1D (S1D4-D) and whose output is one-bit line 152 which is 1 if all of bits S1D4-D are 0 and is 0 if any one of the S1D4-D bits is 1 (i.e., a NOR function). Consequently, the signal outputted by comparator 150 on line 152 serves as a selector to determine which one of delayed IP signals on lines 126 and 148 the function unit will use.

IS is inputted directly on line 72 to function unit 114 (FIG. 5).

The operation of stage delay 112 (FIG. 5) is controlled by first stage delay (S1D) signal and the various timing signals provided by GLU video interface 94 (see also FIG. 3). S1D specifies the delay in pixels to be performed by delay 112 and is loaded into write counter 142 at the beginning of a GLU pass. Also at the initiation of a GLU pass, the value one is loaded into read counter 144 simultaneously with write counter 142. Similarly, the four low-order bits of S1D are applied to multiplexer 120; the three low order bits are applied to multiplexer 124; and the ten high-order bits are applied to comparator 150. The IP bit stream from video bus interface 56 (see also FIG. 3) is inputted to and shifted through shift register 116 under the control of clocking signal DC.

If the shift is a "short" shift (i.e., 0 to 15 bits), the signal S1D0-3 inputted to multiplexer 120 determines which one of the sequential storage locations of shift register 117 is read to provide the proper pixel delay which is then outputted on line 126 to function unit 114 (FIG. 5). When a short shift is involved, all of the ten high-order bits of S1D, namely S1D4-D are zero, and comparator 150 outputs a binary one on line 152. The binary one on line 152 indicates that the IP short delayed signal on line 126 is to be inputted to function unit 114, and the IP long delayed signal on line 148 is to be ignored.

On the other hand, if the shift is a "long" shift (i.e., 16 to 16K-1), the low-order eight bits of shift register 117 are available through bus 122 to multiplexer 124. The three low-order bits of S1D are inputted to multiplexer 124 such that the proper line of bus 122 is selected as an input line to shift register 130 to provide proper skew timing, modulo 8, for the long delay for proper shifting synchronization. The output of multiplexer 124 is then shifted into shift register 130 via line 128. Shift register 130 is clocked by DC and enables the incoming bit stream to be periodically sampled to read segments or pieces in parallel of the serial bit stream. Once every eight pixels or bits, latch (LCH) signal inputted to latch 134 goes high shifting the contents of shift register 130 into latch 134. The contents of latch 134 are then written into the memory location in RAM 136 as indicated by write counter 142. For example, if the delay were 20 (octal), the first location written to in RAM 136 would be 2 (octal). Similarly, if the delay to be provided by stage counter 112 is 240 (octal), the first word from latch 134 would be written into location 24 (octal). After the write operation is complete, the contents of RAM 136 pointed to by read counter 144 is outputted to shift register 140 on bus 146. Because read counter 144 is always initialized to 1, the first read operation from RAM 136 will be from RAM location 1. The writing into and reading from RAM 136 are enabled on every eighth DC pulse as controlled by WE and OE, respectively (the read and write cycles occur once per eight bit segment). The RAM words sequentially shifted into shift register 140 are clocked out of the shift register under the control of clocking signal DC to produce a bit plane on one-bit line 148. Consequently, shift register 140 reserializes the signal which is stored in segmented parallel fashion in RAM 136. On long delays, at least one of the bits S1D4-D will be 1, such that comparator 150 will output a binary zero on line 152 to function unit 114. The binary zero output indicates that the IP long delayed signal on line 148 is to be inputted to function unit 114, and the IP short delayed signal on line 126 is to be ignored.

The structure of delay 112 enables a relatively inexpensive memory device to be used having a read/write cycle substantially slower than the 100 nsec. cycle of the pixel data, but still providing the requisite apparent speed. Accordingly, the above described delay greatly reduces the cost of the GLU while still providing the desired performance characteristics.

GLU Stage Function Unit

Function unit 114 (FIGS. 5 and 6) has as inputs IP short delayed signal on line 126, IP long delayed signal on line 148, IS bit plane on line 72, comparator output on line 152, first stage process function (S1PF) signal on four-line bus 154, and first stage source function (S1SF) signal on four-line bus 156. Function unit 114 provides two outputs—first stage process (S1P) signal on line 158 and first stage source (S1S) signal on line 160.

Function unit 114 (FIG. 6) is implemented using PAL technology and includes switch 162 and a pair of multiplexers 164 and 166. The IP short and long delayed signals are inputted to switch 162 on lines 126 and 148, respectively. Switch 162 operates under the control of comparator output signal from line 152 and applies only one of the IP signals to one-bit line 163 depending upon whether a short or long delay is appropriate. The selected IP signal on line 163 is inputted to both of multiplexers 164 and 166. Similarly, the IS signal inputted on line 72 is inputted to both of multiplexers 164 and 166.

S1PF and S1SF (FIG. 6) determine which of the 16 possible logical functions of the two inputs on lines 72 and 163 will be performed by the respective multiplexers 164 and 166. It is well known to those having ordinary skill in the art that two one-bit inputs can result in 16 possible logic functions as specified in column 168 of FIG. 7. The value of the four-bit signals S1PF and S1SF as set forth in column 170 of FIG. 7 determine which one of the 16 possible logic operations will be performed. For example, if the S1PF signal on bus 154 is 0110, the bit plane outputted on line 168 as S1P will be the exclusive ORing of the bit planes received at terminals A and B of multiplexer 164. Similarly, if the bit value of signal S1SF is 1110, the bit plane S1S outputted on line 160 will be the logical ORing of the bit planes delivered at terminals A and B of multiplexer 166. Consequently, function unit 114 is capable of performing two independent logic functions on the two bit planes inputted to the logic unit. Further, each one of the two independently performed functions can be selected from any one of the 16 possible logic functions of the two incoming planes. This dynamic control of the various function units greatly enhances the capabilities of the GLU and reduces the hardware necessary to implement a tremendous variety of image processings or manipulations.

To complete the description of first stage 58 (FIG. 5) latch 172 provides a one-pixel delay of bit planes S1P and S1S on lines 158 and 160, respectively, to subsequently output these bit lines on output lines 120 and 118, respectively. Latch 172 is clocked by signal DC to insure proper timing throughout the system.

Remaining GLU Stages and Cards

As mentioned above, second stage 60 and third stage 62 are generally identical to first stage 58. Consequently, a bit plane shifted through GLU 22 will receive a minimum of four pixels delay regardless of the path taken through the GLU. This enables proper timing to be provided throughout the GLU.

GLU cards 23 are coupled in series as necessary to provide GLU 22 with the desired number of stages. In the preferred embodiment, GLU 22 includes nine cards 23, such that the total number of stages in the GLU is 27. However, the number of GLU cards selected is entirely optional and may be more or less than nine. When a plurality of boards 23 are serially coupled, the video interfaces and state counters 94 (FIG. 3) on all GLU boards other than the first are disabled to insure that only one set of timing signals is provided for GLU 22.

CLONING-Dilation By A Polar-Symmetric Structuring Element

For purposes of this application, "CLONING" means dilation by a sequence of structuring elements, each including at least two points, one of which is the origin.

Figure 8A:
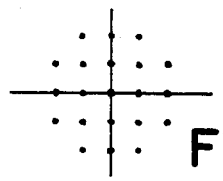
FIG. 8A is a diagram of a digital disc structuring element.
Figure 8B:
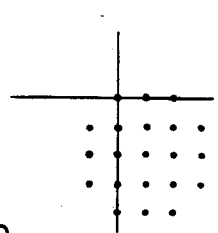
FIG. 8B is a diagram of the dilation of the FIG. 20 image by the logic diagram of FIG. 8.
Figure 8:
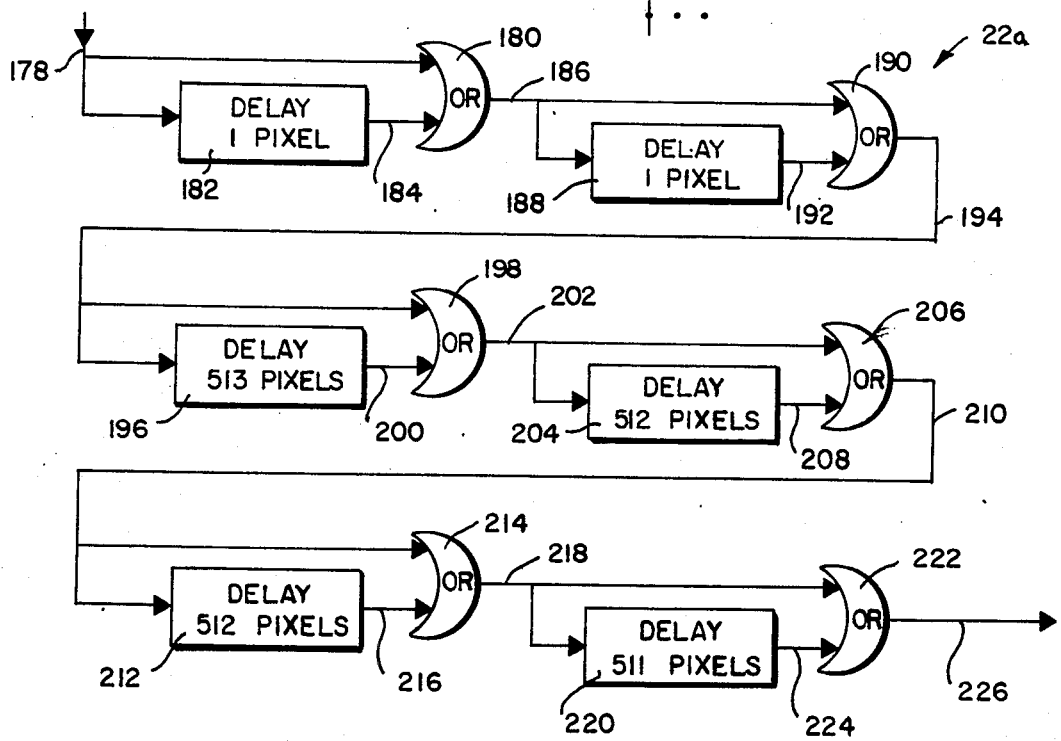
FIG. 8 is a logic diagram showing the functional operation of the geometric logic unit implementing dilation by the digital disc of FIG. 8A.
Figure 2:
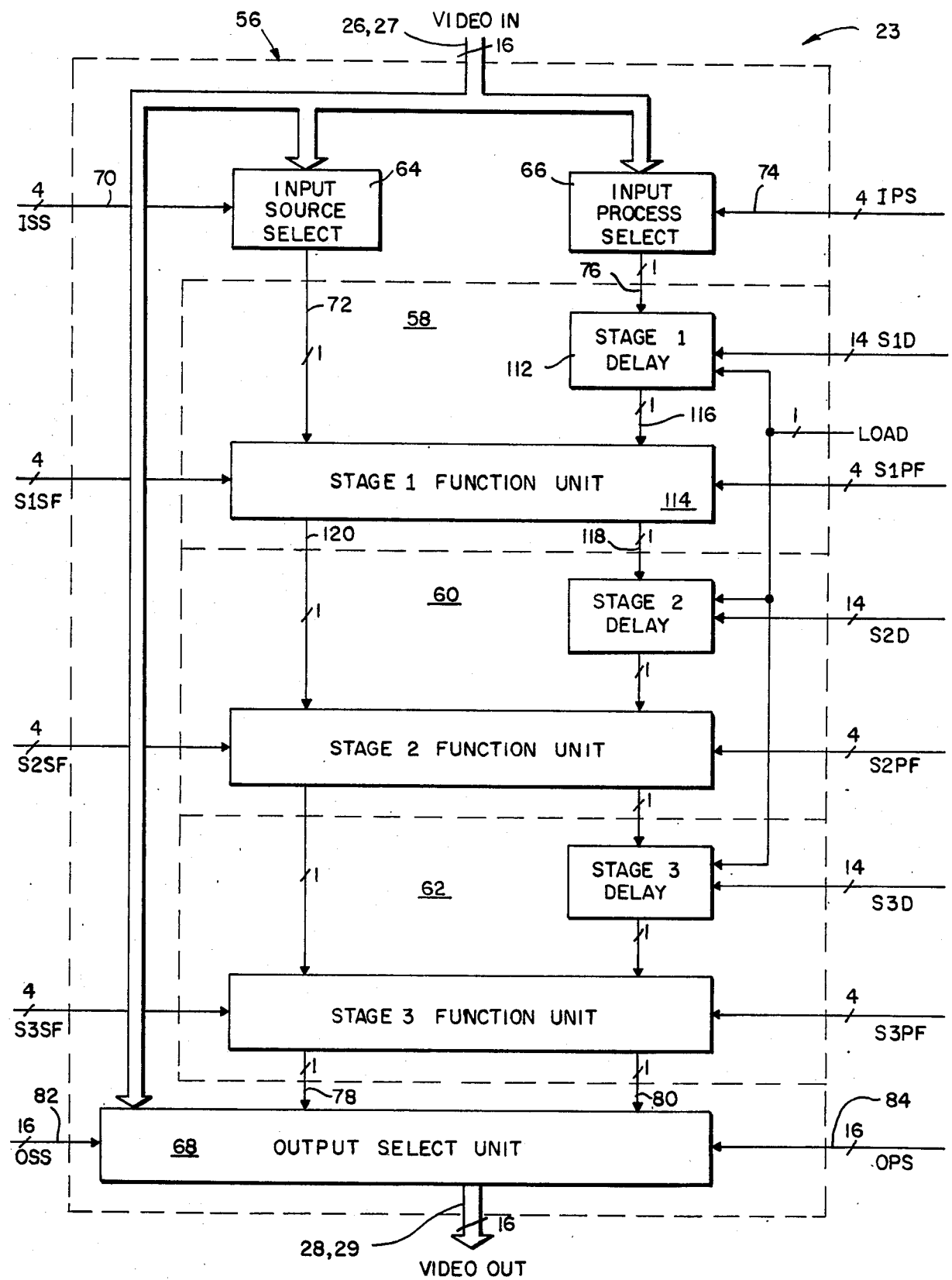
FIG. 2 is a schematic diagram showing one board of the geometric logic unit of the present invention.

The logic diagram to perform dilation by the digital disc shown in FIG. 8A is illustrated in FIG. 8. The following description of FIG. 8 corresponds closely to the dilation example provided in the referenced patent application Ser. No. 513,448. The pixel stream or bit plane to be dilated is input to the diagram on line 178 which leads both directly to OR gate 180 and to one-pixel delay 182. The output of delay 182 is fed over line 184 into OR gate 180. The resultant ORed pixel stream is outputted on line 186 and fed to one-pixel delay 188 and OR gate 190. The output of delay 188 is introduced to OR gate 190 on line 192; and the output of OR gate 190 is outputted on line 194, which leads both to delay 196 and OR gate 198 which also has an input on line 200 from delay 196. The output of OR gate 198 is fed via line 202 to 512-pixel delay 204 and OR gate 206. The delayed bit plane from delay 204 is inputted to OR gate 206 on line 208; and the output of OR gate 206 is applied to line 210, which leads both to delay 212 and OR gate 214. The output of delay 212 is fed via line 216 to OR gate 214, and the output of the OR gate is conducted by line 218 to 511-pixel delay 220 and OR gate 222. The delayed signal from delay 220 is also fed to the OR gate 222 on line 224. The fully dilated image exits on line 226. The ORing illustrated for the binary case is a specific implementation of the generic selection of a maximum value. A single-point pixel dilated by the structuring element of FIG. 8A would result in the image of FIG. 8B which is shifted two lines downwardly and one line to the right from where it should actually be located. Appropriate adjustments are made in software using techniques well known in the art to insure that the output image on line 226 is rewritten to frame buffer 20 utilizing the proper offset to correct pan and scroll of the image.

Figure 9:
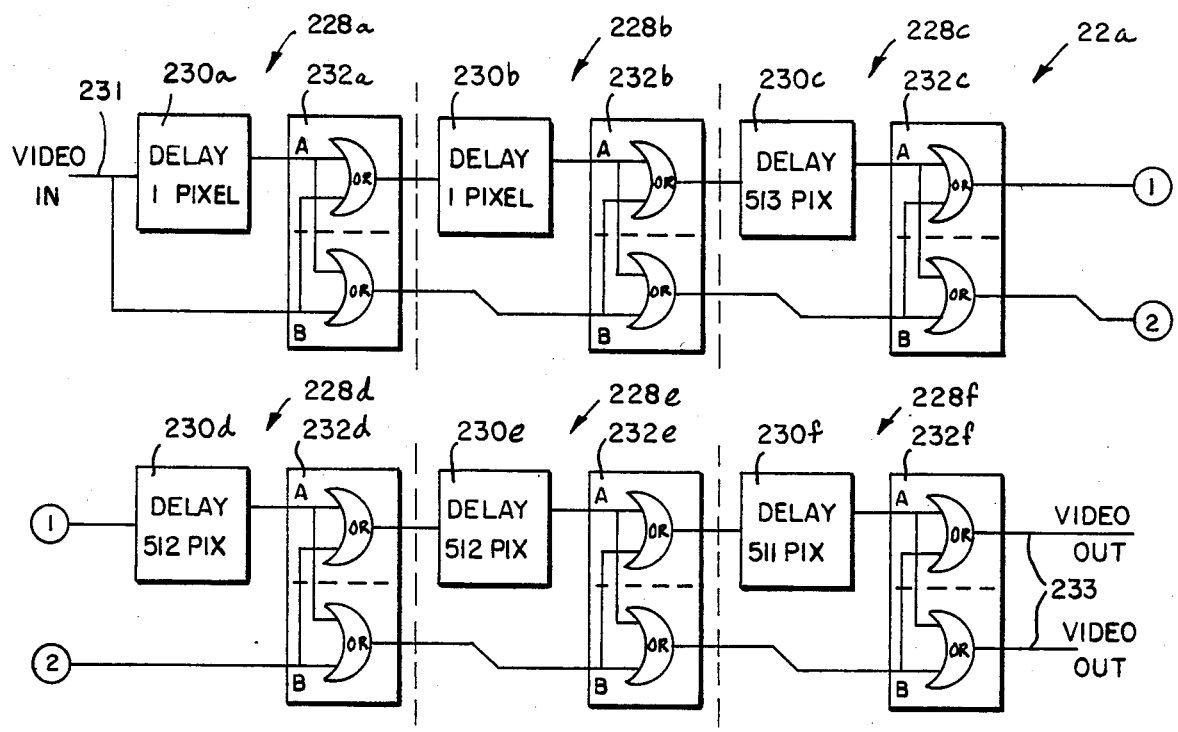
FIG. 9 is a schematic diagram showing the configuration of the geometric logic unit implementing the logic diagram of FIG. 8.

GLU configuration 22a of the logic diagram of FIG. 8 is illustrated in FIG. 9 and includes six stages 228a-f, each of which includes delay 230 and function unit 232. Delays 230a-f are programmed via stage delay signals to provide delays of 1, 1, 513, 512, 512, and 511 pixels, respectively. Each of function boxes 232 is provided with appropriate function signals as required from FIG. 7 to insure that both multiplexers therein function as OR gates. Consequently, each of the logical OR gates of FIG. 8 is implemented in FIG. 9 as a pair of parallel OR gates within each function box 232. Consequently, the GLU configuration 22a of FIG. 9 implements the desired logic operation of FIG. 8 through the GLU hardware 22 disclosed herein. The image to be CLONED is inputted on line 231, while the CLONED image is outputted on both of lines 233.

EXPLOSION-Dilation By A Non-Polar-Symmetric Structuring Element

For purposes of this application, "EXPLOSION" means dilation by a non-polar-symmetric structuring element or by a polar-symmetric structuring element which does not include all points within its perimeter.

FIGS. 10–12 illustrate the concept of image dilation by a ring-shaped element. FIG. 10 illustrates circular ring-shaped structuring element 229 having its center at origin 231. FIG. 11 is an image to be dilated or exploded by the structuring element of FIG. 10. The image includes straight line segment 234 extending from origin 231 along a line X=Y. Additionally the FIG. 11 image includes pixel 236. FIG. 12 represents the dilation or EXPLOSION of the FIG. 11 image by structuring element 229. The single pixel 236 has been exploded to ring 238 identical in size and shape to element 229. Line 234 has been widened to have the same width as the diameter of structuring element 229. Additionally, the opposite ends 242 of shape 240 are semi-circular and have a radius equal to the structuring element 229.

The usefulness of the EXPLOSION operation is illustrated in FIGS. 13–17. FIG. 13 represents a donut-shaped structuring element 244 having its center at the origin 231. FIG. 14 represents an image of a printed circuit board having a plurality of pads 246 each about a hole 248. Pad 246a is defective in that it has a missing portion 250 of conductor which could lead to a poor connection. FIG. 15 is a virtual image corresponding to the FIG. 14 image and includes one single pixel 248a corresponding to the centers of holes 248 in image FIG. 14. The FIG. 14 image can be derived by a sequence of dilations and/or erosions of the type described in the referenced patent application Ser. No. 513,448. The FIG. 15 image is dilated by the FIG. 13 structuring element 244 to produce the virtual image of FIG. 16. Consequently, FIG. 16 illustrates three copies of the structuring element (an idealized pad) 244a centered about the previous pixel locations 248a of FIG. 15. The completion of the image processing is accomplished by determining those positions in FIGS. 14 and 16 having different logical values. Such an exclusive ORing will determine where the pads are defective and results in the image 252 of FIG. 17 which is identical in shape to scallop 250 in the defective pad 246a (see FIG. 14). Consequently, the described sequence of image processing enables the computer to detect defective pads.

Figure 18:
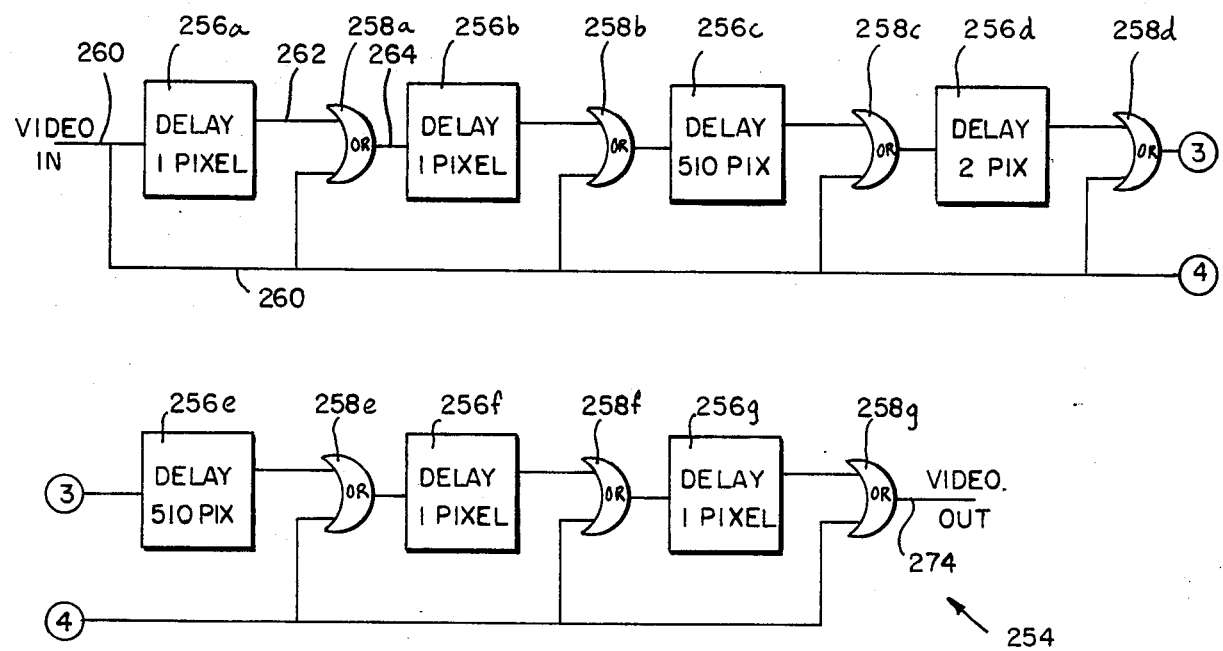
FIG. 18 is a logic diagram implementing dilation by the digital ring structuring element of FIG. 21.

A logic diagram 254 for accomplishing an EXPLOSION by the structuring element 266 (FIG. 21) is illustrated in FIG. 18. The logic diagram includes seven delays 256a–g and OR gates 258a–g. Delays 256a–g provide delays of 1, 1, 510, 2, 510, 1, and 1 pixels, respectively. The inputted video image is introduced on line 260 and is delivered to each of OR gates 258. Additionally, the input line 260 is supplied to delay 256a which outputs the delayed bit plane on line 262 to OR gate 258a. OR gate 258a then supplies its output to the next sequential delay 256b via line 264. Similarly, each of delays 256 supplies an output bit plane to the subsequent OR gate 258, and each OR gate 258 applies its output to the subsequent delay 256.

Figure 20:
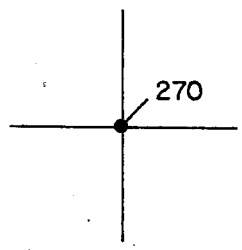
FIG. 20 is a diagram of a single pixel.
Figure 21:
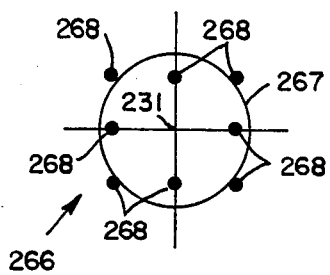
FIG. 21 is a diagram of a digital ring structuring element.
Figure 22:
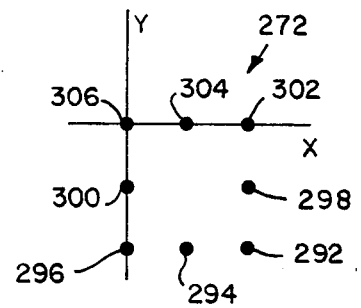
FIG. 22 is a diagram of the dilation of the FIG. 20 diagram by the logic diagram of FIG. 19.

The EXPLOSION structuring element implemented by the logic diagram of FIG. 18 is illustrated in FIG. 21 and designated 266. The structuring element includes the eight pixels 268 defining a square having dimensions 2 pixels by 2 pixels about the origin 231. This pattern represents a digital ring approximating Euclidean ring 267 having a diameter of approximately 1.2 pixels. The processing of a single pixel 270 as represented in FIG. 20 by the structuring element 266 of FIG. 21 results in the output image 272 illustrated in FIG. 22. Output image 272 is a 2 pixel by 2 pixel hollow square including eight pixels forming two edges aligned with the positive X and negative Y axes. The bit plane outputted by logic diagram 254 on line 274 (see FIG. 18) corresponds to the image 272 of FIG. 22. Image 272 is offset from its actual location by +1 line (down), +1 pixel (right); and accordingly appropriate adjustments must be made via software to return image 272 to frame buffer 20 with proper pan and scroll to insure proper position. This is readily accomplished by one having ordinary skill in the art.

Figure 19:
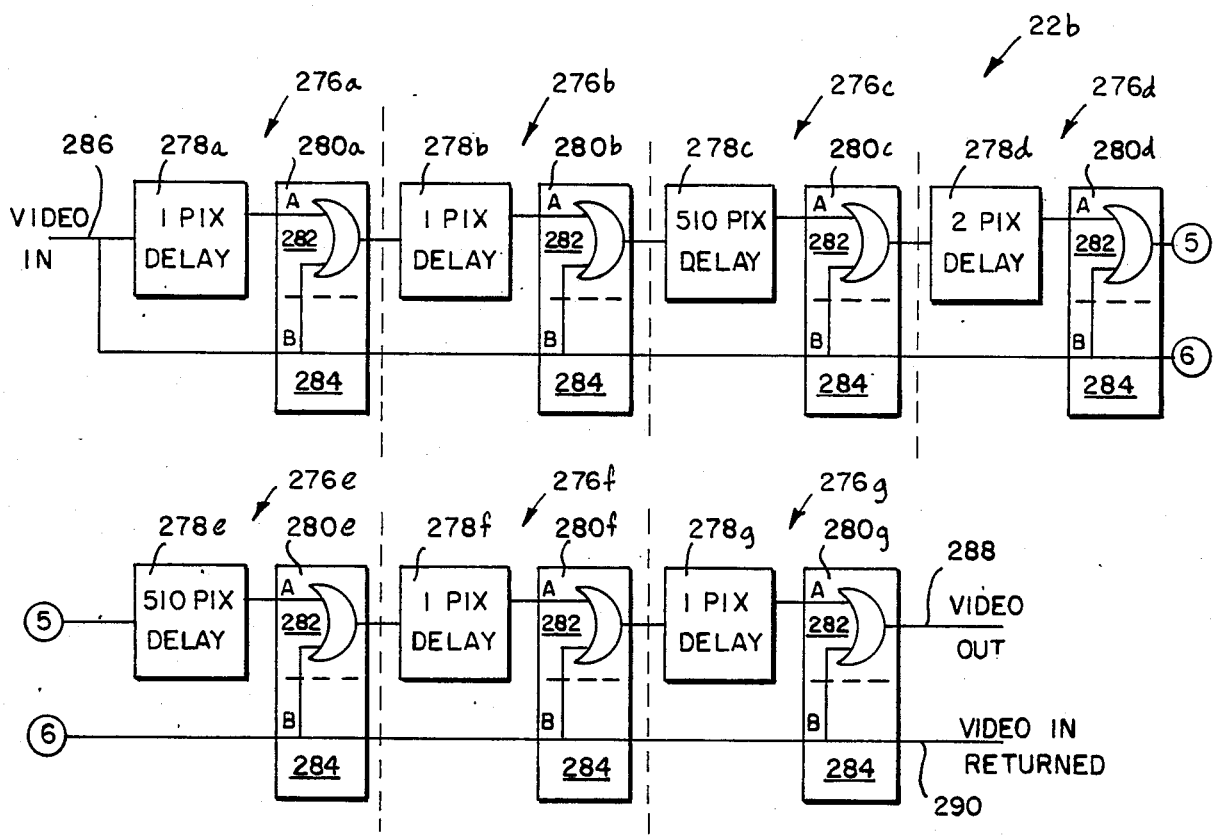
FIG. 19 is a schematic diagram showing the configuration of the geometric logic unit implementing the logic diagram of FIG. 18.
Figure 23:
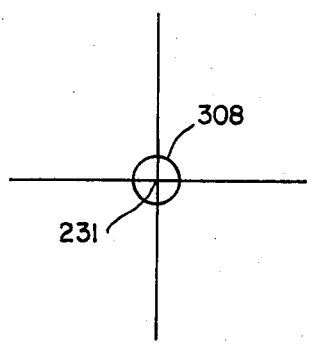
FIG. 23 is an image of a ring-shaped structuring element.

GLU configuration 22b illustrated in FIG. 19 implements the logic diagram 254 of FIG. 18. Configuration 22b includes seven stages 276a–g each of which includes a delay 278 and a function unit 280. Delays 278a –g provide delays of 1, 1, 510, 2, 510, 1, and 1 pixels corresponding to the sequential delays in FIG. 18. Each of function units 280 includes an upper multiplexer 282 programmed to perform an OR function and a lower multiplexer 284 implemented to perform a PASS function on the B input. The bit plane image to be processed is delivered on line 286 to first delay 278a and to first function box 280a at terminal B. The output of each delay 278 is delivered to the A terminal of function unit 280 within the same stage. The output of each multiplexer 282 is delivered to the delay 278 in the next sequential stage 276. The output of each multiplexer 284 is fed to the B terminal of the next sequential function unit 280. GLU configuration 22b results in an output image outputted on line 288, while the original inputted image is returned on line 290.

EXPLOSION of pixel 270 (FIG. 20) to produce virtual image 272 will now be described. Input pixel 270 which passes through delay 278a and accordingly all of delays 278 will result in pixel 292 in image 272. Pixel 270 which bypasses delay 278a but is introduced through multiplexer 282 of function unit 280a will result in pixel 294 in resultant image 272. Similarly, pixel 270 as it is introduced through delays 278c–g results in pixels 296, 298, 300, 302, 304, and 306. Consequently, the output bit plane on 288 will appear as image 272 when input pixel 270 (FIG. 20) is inputted to the GLU configuration 22b. Appropriate panning and scrolling done through software returns the virtual image 272 by the proper offset such that the image is properly recorded within frame buffer 20.

IMPLOSION-Erosion By A Structuring Element Of Ones

Figure 24:
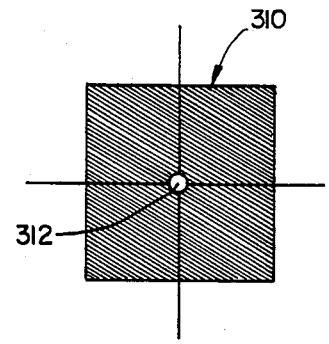
FIG. 24 is a diagram of an image to be eroded.
Figure 25:
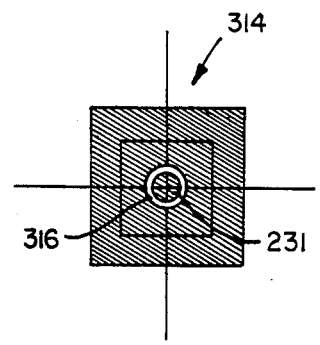
FIG. 25 is a diagram illustrating the erosion of the FIG. 24 image by the FIG. 23 structuring element.

FIGS. 23–29 illustrate the concept of IMPLOSION, which is a specialized form of EROSION. Structuring element 308 is ring-shaped having its center at origin 231. Image 310 to be eroded is illustrated in FIG. 24. Image 310 is square and includes one 0 pixel 312 at the origin. Image 314 illustrating the IMPLOSION of image 310 by structuring element 308 is illustrated in FIG. 25. Image 314 includes a square perimeter which is shorter on each side from image 310 by an amount equal to the diameter of structuring element 308. The image is generally continuous with the exception of an open ring of pixels 316 at a radius equal to the radius of structuring element 308 from origin 231.

Figure 26:
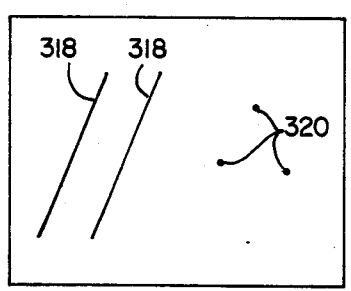
FIG. 26 illustrates an image of a surface including scratches and pits.
Figure 27:
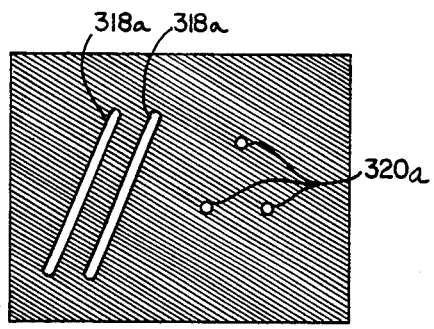
FIG. 27 is the logical complement of FIG. 26.
Figure 28:
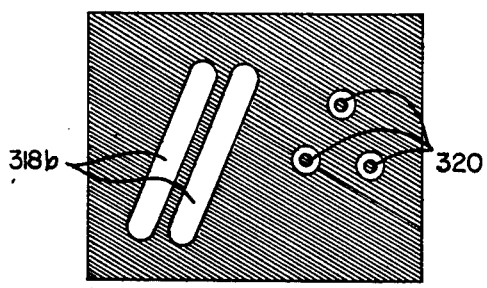
FIG. 28 is the erosion of FIG. 27 by a ring-shaped structuring element.
Figure 29:
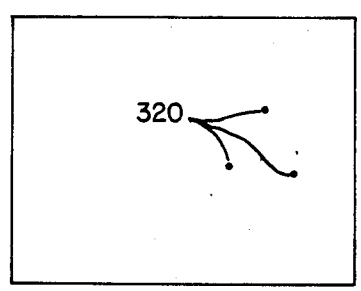
FIG. 29 is the logic ANDing of the images of FIGS. 26 and 28.

The utility of the IMPLOSION operation is illustrated in FIGS. 26–29. FIG. 26 is an image of a machined surface to be inspected including a pair of elongated scratches 318 and three pits of nearly single pixel width 320. It is desired to distinguish the pits from the scratches which is relatively easily performed utilizing the IMPLOSION command. The FIG. 26 image is first complemented to produce the FIG. 27 image. More specifically, each pixel having a value of 1 in FIG. 26 has a value of 0 in FIG. 27 and vice versa. The FIG. 27 image is then eroded by a circular ring-shaped element having its center at the origin resulting in the image illustrated in FIG. 28. IMPLODED lines 318a result in shapes 318b each of which has a width equal to the diameter of the structuring element and opposite rounded ends having radii equal to the radius of the structuring element. Each of complemented pits 320a results in a ring of 0 pixels 320b. The images of FIGS. 26 and 28 have no illuminated pixels in common along lines 318 but do have illuminated pixels in common at pits 320. Accordingly, the image of FIG. 29, produced by ANDing the FIG. 26 and FIG. 28 images, results in an image containing only pits 320.

Figure 30:
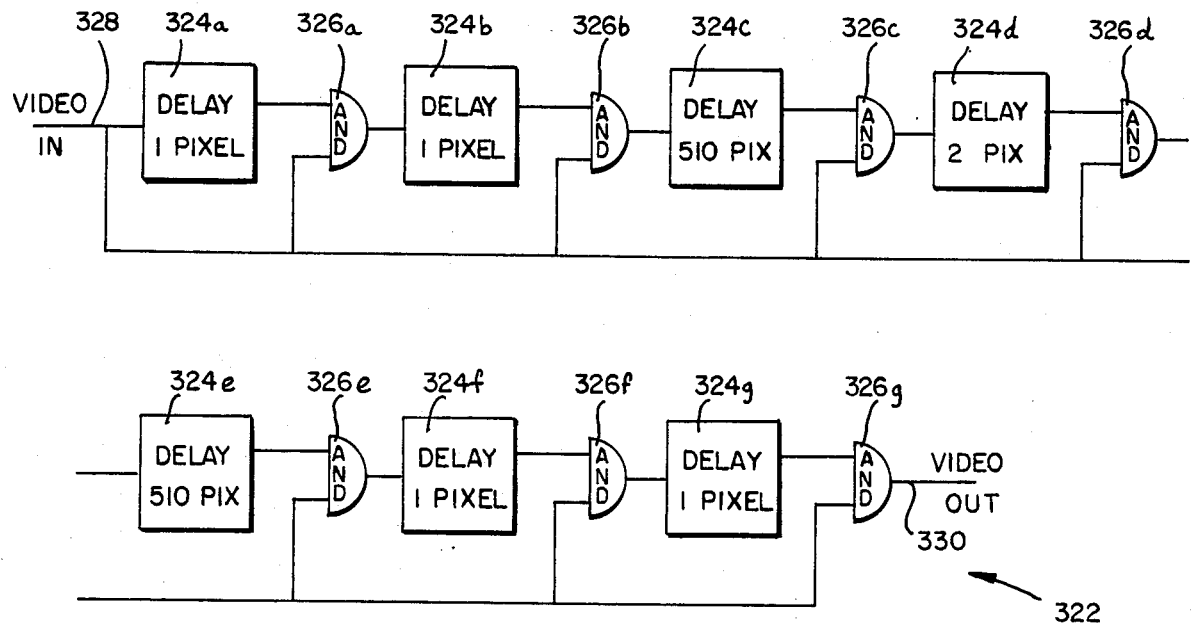
FIG. 30 is a logic diagram implementing erosion by the digital ring structuring element of FIG. 21.

Logic diagram 322 implementing IMPLOSION by the FIG. 21 structuring element is illustrated in FIG. 30 and includes a plurality of sequential delays 324a–g and AND gates 326a–g. Delays 324a–g provide delays of 1, 1, 510, 2, 510, 1, and 1 pixels, respectively. The bit plane to be IMPLODED is inputted on line 328 to delay 324a and to each of AND gates 326. The output of each delay 324 is delivered to the next sequential AND gate 326. Similarly, the output of each AND gate 326 is applied as the input to the next sequential delay 324. The IMPLODED image is outputted on line 330 and is stored in frame buffer 20 utilizing an offset as necessary to return the image to its properly panned and scrolled position. The ANDing illustrated for the binary case is a specific implementation of the generic selection of a minimum value.

Logic diagram 322 of FIG. 30 implements an IMPLOSION by the structuring element 266 of FIG. 21. More particularly, a pixel will be outputted only when an image portion corresponding to the structuring element 266 of FIG. 21 is detected. A single pixel 332 (FIG. 32) is outputted on line 330 when and only when an image portion is inputted on line 328 corresponding to structuring element 266. Pixel 332 (FIG. 32) shoud actually be oriented at the origin. Appropriate panning and scrolling provisions are made in software when writing the bit plane back into frame buffer 20 to account for this offset and store the image in its proper location.

Figure 31:
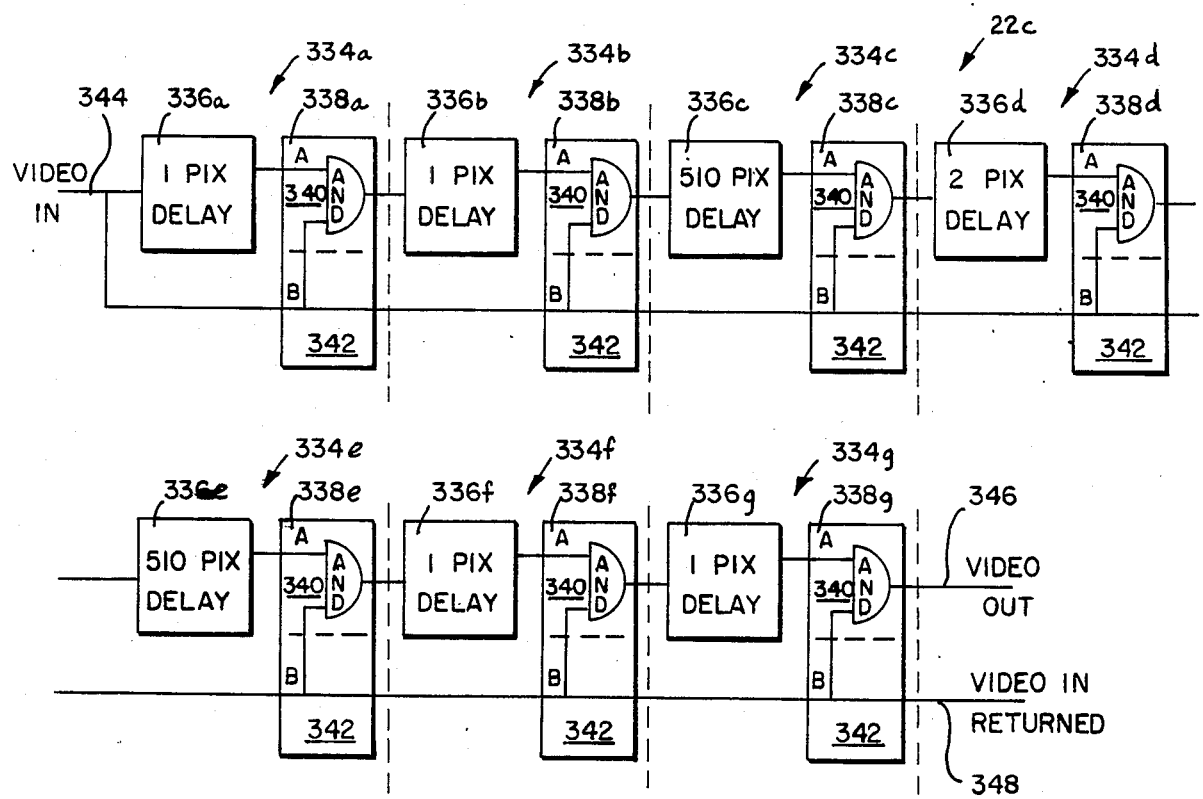
FIG. 31 is a schematic diagram showing the geometric logic unit configuration implementing the FIG. 30 logic diagram.

GLU configuration 22c (FIG. 31) illustrates the configuration of the GLU 22 during the IMPLODE operation logically diagrammed in FIG. 30. More specifically, GLU configuration 22c includes seven stage 334a–g, each including delay 336a–g and function unit 338a–g, respectively. Delays 336a–g supply delays of 1, 1, 510, 2, 510, 1, and 1 pixels, respectively. Each of function units 338 includes two multiplexers 340 and 342. Multiplexers 340 are dynamically selected to operate as AND gates, while multiplexers 342 are dynamically selected to operate as PASS functions for the input at the B terminal. The input video signal or bit plane is applied via line 344 to the first delay 336a and terminal B on the first multiplexer 338a. The output of each delay 336 is applied to the A terminal of the associated function unit 338; while the output of each multiplexer 340 is applied to the next sequential delay 336b. The output of all of multiplexers 342 is applied to the B terminal of the next sequential function unit 338 such that the input on line 344 is passed sequentially through the various stages 334. Consequently, the IMPLODED output is delivered on line 346; while the input bit plane is returned on line 348. The signal on line 346 is panned and/or scrolled in software as necessary to store the image with the proper offset in the frame buffer to return the image to its actual location.

TEMPLATE MATCHING—Erosion By A Structuring Element Of Ones And Zeros

Figure 33:
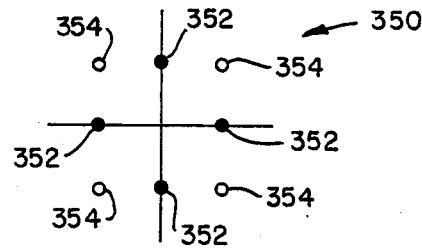
FIG. 33 is a diagram of a digital ring structuring element or template including pixels having values of zero and one.

The present GLU 22 also enables rapid "TEMPLATE MATCHING", which is an extension of the IMPLOSION operation. More particularly, TEMPLATE MATCHING is an IMPLOSION by a structuring element including both 1 and 0 specified pixels in the structuring element. One such structuring element 350 is illustrated in FIG. 33 and includes four pixels 352 having the value 1 and four pixels 354 having the value 0. Pixels 354 define the corners of a 2-by-2 pixel square having its center at the origin. Pixels 352 are located mediate each pair of pixels 354.

Figure 34:
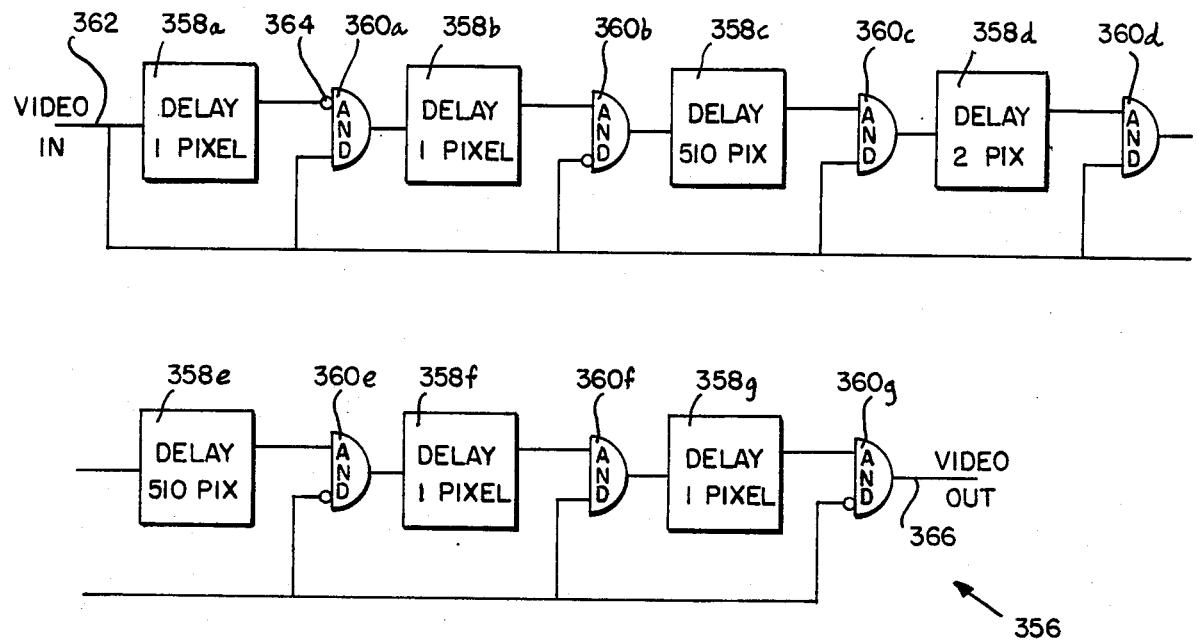
FIG. 34 is a logic diagram implementing erosion, or "template matching", by the digital ring structuring element, or template, of FIG. 33.

Logic diagram 356 (FIG. 34) enables TEMPLATE MATCHING by the structuring element illustrated in FIG. 33. Logic diagram 356 includes a plurality of delays 358a–g and a plurality of AND gates 360a–g. Logic diagram 356 for implementing TEMPLATE MATCHING is generally identical to logic diagram 322 (FIG. 30) for implementing IMPLOSION with the exception that certain inputs to AND gates 368 must be complemented to correspond to 0 pixels 354 in structuring element 350 (see FIG. 33). Delays 358a–g provide 1, 1, 510, 2, 510, 1, and 1 pixel delays, respectively. The input video bit plane is applied through line 362 to first delay 358a and to each of AND gates 360. The output of each of delays 358 is fed to the next sequential AND gate 360, while the output of each AND gate 360 is fed to the next sequential delay 358. The output of delay 358a is complemented by inverter 364 prior to its application to AND gate 360a. Similarly, the input video bit stream on line 362 is complemented just prior to being applied to AND gates 360b, 360e, and 360g. The output video signal is outputted on line 366 and will be 1 if and only if the input pixel stream corresponds to the template or structuring element illustrated in FIG. 33.

Figure 32:
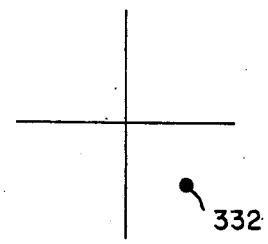
FIG. 32 is a diagram of the erosion of the FIG. 21 diagram by the logic diagram of FIG. 30.
Figure 35:
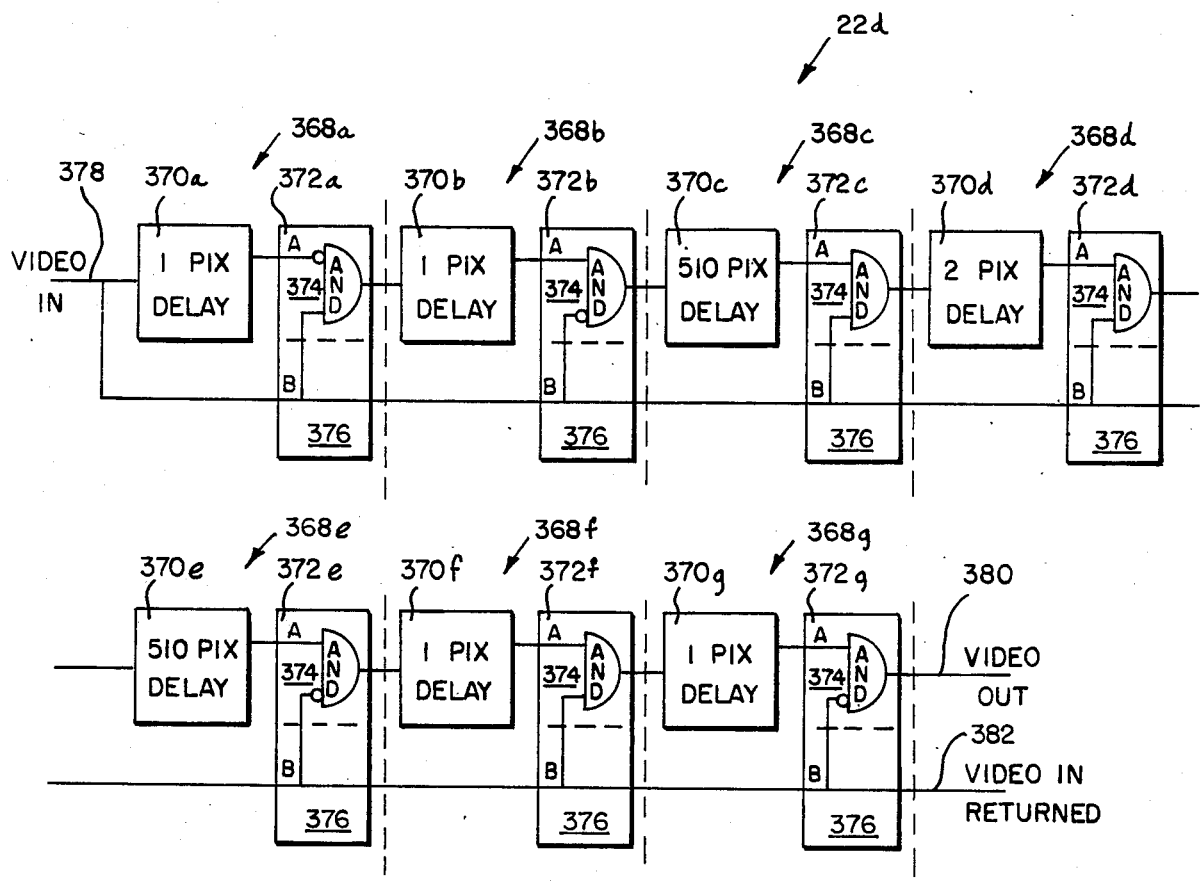
FIG. 35 is a schematic diagram showing the geometric logic unit configuration implementing the FIG. 34 logic diagram.

GLU configuration 22d (FIG. 35) implements logic diagram 356 and includes seven stages 368a–g, each including delay 370a–g and function unit 372a–g, respectively. Each of function units 372 in turn includes two multiplexers 374 and 376. Multiplexers 374 of function units 372c, 372d, and 372f are selected to perform the functions A AND B. Multiplexer 374 of function units 372a is selected to perform the function NOT A AND B. Multiplexers 374 of function units 372b, 372e, and 372g are selected to perform the function A AND NOT B. Multiplexers 376 on all function units 372 are selected to perform the function B which passes the input bit plane. The input video bit stream or bit plane is inputted on line 378 and is applied to first delay 370a and to terminal B of first function unit 372a. Each delay 370a is coupled to terminal A of the associated function unit 372. The output of each multiplexer 374 is applied to the next sequential delay 370. The output of each multiplexer 376 is applied to the next sequential function unit 372 at terminal B. Consequently, the TEMPLATE-MATCHED image is returned on line 380 offset as indicated in FIG. 32 from the origin. Appropriate pan and scroll adjustments are made in software to correct the placement of this image into frame buffer 20. The original video signa is returned on line 382.

Although system 10 has been described such that each pixel is represented by a single binary bit, it will be appreciated by those having ordinary skill in the art that the concepts disclosed herein are equally applicable to gray-scale imaging wherein each pixel is represented by a plurality of bits. In particular, the grayscale equivalent of the binary OR function is the selection of a maximum value. Additionally, the grayscale equivalent of the binary AND function is the selection of a minimum value.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A system for processing at least one serial signal each representative of an image made up of a matrix of points to produce at least one serial signal each representative of an image processed by a dynamically selectable structuring element, said system comprising:
   at least one geometric logic unit each including:
      input port means for receiving at least one input serial signal;
      controllable delay means for delaying at least one selected input signal to produce at least one delayed srial signal each corresponding to one of the input signals;
      operation means for operating on selected ones of the delayed signals and the input signals to produce at least one output serial signal, said operation means including function means capable of performing a plurality of functions and selector means for selecting one of the functions to be performed; and
      output port means for outputting the output signals; and
   first control means for routing the serial signal through a geometric logic unit at least twice; and
   second control means for dynamically controlling the delay provided by each delay means each time the serial signal passes therethrough, whereby the serial signal can be delayed in a dynamically selectable pattern corresponding to a dynamically selectable structuring element.

2. A system a defined in claim 1 wherein said function means includes at least one multiplexer.

3. A system as defined in claim 2 wherein said multiplexer includes two input ports and further wherein said selector means enables the selection of any one of the sixteen possible logical functions of two binary inputs.

4. A system as defined in claim 3 wherein said function means includes two of said multiplexers each having first and second input ports for receiving one of the delayed signals and one of the input signals, each of said multiplexers producing one of the output signals.

5. A system as defined in claim 1 wherein said function means comprises:
   first logic means for logically combining one of the delayed signals and one of the input signals to produce a first output signal; and
   second logic means for logically combining the one delayed signal and the one input signal to produce a second output signal.

6. A system as defined in claim 5 wherein the first and second logic means comprise means for selecting the maximum of the one delayed signal and the one input signal.

7. A system as defined in claim 5 wherein said first and second logic means comprise multiplexer means for performing any of the sixteen possible logic functions of two binary inputs thereto.

8. A system as defined in claim 1 wherein said function means comprises:
   first logic means for logically combining one of the delayed signals and one of the input signals to produce a first output signal; and
   second logic means for passing the one input signal as a second output signal.

9. A system as defined in claim 8 wherein said first logic means comprises means for selecting the maximum of the one delay signal and the one input signal.

10. A system as defined in claim 8 wherein said first logic means comprises means for selecting the minimum of the one delay signal and the one input signal.

11. A system as defined in claim 10 wherein said first logic means further comprises means for complementing at least one of the one delayed signal and the one input signal.

12. A system as defined in claim 1 wherein said delay means comprises:
   accumulating means for accumulating sequences of the serial signal;
   storage means for storing each of the sequences as a unit;
   retrieval means for retrieving the sequences from said storage means; and
   re-serializing means for re-serializing the retrieved sequences.

13. A system as defined in claim 1 wherein said delay means comprises:
   (1) a short shift section including shift register means for shifting the serial signal to produce a short delayed serial signal;
   (2) a long shift section including:
      (a) means for periodically reading segments of the serial signal in parallel from said shift register means;
      (b) storage means for storing the segments;
      (c) re-serializing means for receiving the segments from said storage means and for serializing the segments to produce a long delayed serial signal; and
   (3) selecting means for selecting one of the delayed signals as an output signal.

14. A method of manipulating at least one input serial signal each representative of an image to produce at least one resultant serial signal each representative of an image processed by a variable structuring element, said method comprising:
   routing each input serial signal through a plurality of processing sequences each including:
      supplying at least one serial signal each to an input port;
      delaying at least one of the serial signals to produce at least one delayed signal each corresponding to one of the serial signals; and
      operating on selected ones of the delayed signals and the serial signals to produce at least one output serial signal, said combining step including providing the capability of performing a plurality of operations and selecting one of the operation to be performed; and varying the delay provided by each delaying step as each serial signal is routed therethrough so that each input signal is delayed in a variable pattern corresponding to a variable structuring element.

15. A method as defined in claim 14 wherein said operating step comprises performing logical operations on one of the delayed signals and one of the serial signals.

16. A method as defined in claim 15 wherein said performing step comprises selecting one of the sixteen possible logic functions of two binary inputs and performing the one logic function on the one delayed signal and the one serial signal.

17. A method as defined in claim 15 wherein said performing step comprises selecting the maximum of the one delay signal and the one serial signal to produce a first output signal.

18. A method as defined in claim 17 wherein said performing step further comprises passing said one serial signal as a second output signal.

19. A method as defined in claim 15 wherein said performing step comprises selecting the minimum of the one delay signal and the one serial signal to produce a first output signal.

20. A method as defined in claim 19 wherein said performing step further comprises passing said one serial signal as a second output signal.

21. A method as defined in claim 19 wherein said performing step further comprises complementing at least one of the one delayed signal and the one serial signal.

22. A method as defined in claim 14 wherein said delaying step comprises:
segmenting the serial signal to produce segments;
sequentially storing the segments;
retrieving the segments; and
serializing the segments to produce a shifted serial signal corresponding to the serial signal.

23. A method as defined in claim 14 wherein said delaying step comprises:
sequentially shifting the serial signal through a hardware device;
periodically storing the signal from a portion of the hardware device to store the serial signal in segments;
sequentially retrieving the segments from storage; and
re-serializing the segments to produce a time-delayed serial signal.

24. An image processing system for processing at least one start image each made up of a matrix of points by a selectable structuring element, said system comprising:
serializing means for producing at least one start serial signal each representative of one of the start images;
controllable delay means for variably time delaying selected ones of the input signals inputted thereto to produce at least one delayed serial signal each corresponding to one of the input signals;
operating means for performing operations on selected ones of the delayed signals and the input signals to produce at least one output serial signal, said operating means including function means capable of performing a plurality of operations and selector means for selecting one of the operations to be performed; and
first control means for repetitively routing the selected ones of the input signals through said delay means and said operating means; and
second control means for controlling the length of the time delay provided by said delay means each time an input signal is delayed therethrough to effect processing by a selectable structuring element.

25. A system as defined in claim 24 wherein said function means comprises means for performing logical operations on one of the delay signals and one of the first signals.

26. A system as defined in claim 24 wherein said operating means further comprises second function means identical to said first function means.

27. A system as defined in claim 26 wherein said second function means includes means for passing one of the input signals as an output signal.

28. A system as defined in claim 24 wherein said function means includes means for performing all sixteen possible logical functions of two binary inputs.

29. A system as defined in claim 1 wherein said function means comprises a multiplexer.

30. A system as defined in claim 24 wherein said delay means comprises:
(1) a short shift section including shift register means for shifting the serial signal to produce a short delayed serial signal;
(2) a long shift section including:
(a) means for periodically reading segments of the serial signal in parallel from said shift register means;
(b) storage means for storing the segments; and
(c) re-serializing means for receiving the segments from said storage means and for serializing the segments to produce a long delayed serial signal; and
(3) selecting means for selecting one of the delayed signals as an output signal.

31. A method of processing at least one image each made up of a matrix of points by a selectable structuring element, said method comprising:
serializing each matrix of points into an input serial input;
repetitively performing the steps of:
controllably shifting at least one of the input serial signals to produce a shifted serial signal; and
operating on selected ones of the input serial signals and the delayed serial signals to produce at least one output signal, said operating step including providing a capability of performing a plurality of operations and selecting one of the operations to be performed; and
controlling the delay provided in each delaying step so that each input serial signal is delayed in a controllable pattern representing the selectable structuring element.

32. A method as defined in claim 31 wherein said operating step comprises logically operating on one of the delayed signals and one of the input signals to produce the output signals.

33. A method as defined in claim 31 wherein said providing step comprises providing the capability of performing all sixteen possible logic operations of two binary inputs.

34. A method as defined in claim 31 wherein said operating step comprises:

selecting the maximum of one of the shifted signals and one of the input signals; and passing the one input signal.

35. A method as defined in claim 31 wherein said operating step comprises:

selecting the minimum of one of the shifted signals and one of the input signals; and passing the one input signal.

36. A method as defined in claim 35 further comprising complementing at least one of the one shifted signal and the one input signal prior to the selecting step.

37. A method as defined in claim 31 wherein said shifting step comprises:

sequentially shifting the serial signal through a hardware device;

periodically storing the content of the hardware device to store the serial signal in segments;

sequentially retrieving the segments from storage; and re-serializing the segments to produce a time-delayed serial signal.

* * * * *

UNITED STATES PATENT AND TRADEMARK OFFICE
CERTIFICATE OF CORRECTION

PATENT NO. : 4,665,551

DATED : May 12, 1987

INVENTOR(S) : Stanley R. Sternberg et al

Page 1 of 2

It is certified that error appears in the above-identified patent and that said Letters Patent is hereby corrected as shown below:

Column 2, Line 26:
  "one" should be --on--.

Column 5, Line 63:
  "59" should be --50--.

Column 11, Line 36:
  "168" should be --158--.

Column 15, Line 45:
  "shoud" should be --should--.

Column 15, Line 54:
  "stage" should be --stages--.

Column 17, Line 2:
  "signa" should be --signal--.

Column 17, Claim 1, Line 34:
  "srial" should be --serial--.

Column 17, Claim 2, Line 53:
  "a" should be --as--.

UNITED STATES PATENT AND TRADEMARK OFFICE
CERTIFICATE OF CORRECTION

PATENT NO. : 4,665,551

DATED : May 12, 1987

INVENTOR(S) : Stanley R. Sternberg et al

It is certified that error appears in the above-identified patent and that said Letters Patent is hereby corrected as shown below:

Column 20, Claim 29, Line 25:
"claim 1" should be --claim 28--.

Column 20, Claim 31, Lines 46 and 47:
"serial input" should be --serial signal--.

Signed and Sealed this

Seventeenth Day of November, 1987

Attest:

DONALD J. QUIGG

*Attesting Officer*   *Commissioner of Patents and Trademarks*